(12) United States Patent
Buchholtz

(10) Patent No.: US 6,997,121 B2
(45) Date of Patent: Feb. 14, 2006

(54) MINIMUM TILLAGE AGRICULTURAL IMPLEMENT HAVING FURROW OPENING SHANK ASSEMBLIES

(75) Inventor: Paul H. Buchholtz, Rosalia, WA (US)

(73) Assignee: The McGregory Company, Colfax, WA (US)

( * ) Notice: Subject to any disclaimer, the term of this patent is extended or adjusted under 35 U.S.C. 154(b) by 131 days.

(21) Appl. No.: 10/738,762

(22) Filed: Dec. 16, 2003

(65) Prior Publication Data
US 2004/0149187 A1  Aug. 5, 2004

Related U.S. Application Data

(63) Continuation-in-part of application No. 10/229,549, filed on Aug. 28, 2002, now Pat. No. 6,688,243.

(51) Int. Cl.
A01C 23/00 (2006.01)
A01B 49/04 (2006.01)
A01B 61/00 (2006.01)
A01B 13/08 (2006.01)

(52) U.S. Cl. .................. 111/123; 111/147; 111/200; 172/265; 172/699; 172/773

(58) Field of Classification Search ............... 172/261, 172/263, 264, 265, 699, 773; 111/139, 143, 111/147, 154, 200, 118–126
See application file for complete search history.

(56) References Cited

U.S. PATENT DOCUMENTS 3,385,243 A * 5/1968 Zimmerman ................ 111/191
3,394,669 A * 7/1968 Ten Pas et al. ............. 111/143
3,736,989 A   6/1973 Randol et al. .............. 172/759
3,999,614 A  12/1976 Rhoads ....................... 172/719
4,036,305 A * 7/1977 Kinzenbaw ................. 172/283
4,530,406 A * 7/1985 Hake et al. ................. 172/705
4,601,248 A   7/1986 Beasley ...................... 111/52
4,762,075 A   8/1988 Halford ....................... 111/73
4,799,823 A   1/1989 Williams .................... 405/180
4,926,767 A * 5/1990 Thomas ...................... 111/187
4,932,478 A   6/1990 Jones ......................... 172/699
5,165,487 A  11/1992 Williams et al. ............ 172/699
5,279,236 A * 1/1994 Truax ......................... 111/139
5,303,662 A   4/1994 Drake ......................... 111/52
5,333,694 A   8/1994 Roggenbuck et al. ....... 172/156
5,529,128 A   6/1996 Peterson et al. ............. 172/145
5,540,288 A   7/1996 Dietrich, Sr. ................ 172/196
5,697,172 A * 12/1997 Verseef ........................ 37/232
5,724,903 A   3/1998 Yoder et al. ................ 111/194
5,787,994 A   8/1998 Friesen .................... 172/772.5
5,819,855 A  10/1998 Tarver, III ................. 172/166
6,009,955 A   1/2000 Tarver, III ................. 172/166

(Continued)

FOREIGN PATENT DOCUMENTS

FR         2 586 889      *  9/1985

*Primary Examiner*—Christopher J. Novosad
(74) *Attorney, Agent, or Firm*—Wells St. John P.S.

(57) ABSTRACT

An agricultural implement for forming a furrow in a soil, is described and which includes a rotatable shank; a resilient, movement limiting member disposed in force transmitting relation relative to the rotatable shank; and a pair of wheels mounted for earth engaging movement, and respectively positioned on the opposite sides of the rotatable shank, and wherein the pair of wheels are positioned substantially laterally outwardly and rearwardly of an intended direction of movement of the shank.

26 Claims, 19 Drawing Sheets

U.S. PATENT DOCUMENTS

| | | | |
|---|---|---|---|
| 6,065,548 A * | 5/2000 | Zaun et al. | 172/265 |
| 6,102,132 A * | 8/2000 | Schimke | 172/498 |
| 6,276,462 B1 | 8/2001 | Dietrich, Sr. | 172/138 |
| 6,325,156 B1 | 12/2001 | Barry | 172/518 |
| 6,345,671 B1 | 2/2002 | Siemens et al. | 172/556 |
| 6,397,767 B1 | 6/2002 | Dietrich, Sr. | 111/119 |
| 6,612,381 B1 | 9/2003 | Powell et al. | 172/586 |
| 6,751,894 B1 * | 6/2004 | Verseef | 37/266 |

* cited by examiner

US 6,997,121 B2

MINIMUM TILLAGE AGRICULTURAL IMPLEMENT HAVING FURROW OPENING SHANK ASSEMBLIES

CROSS REFERENCE TO RELATED APPLICATION

This application is a Continuation-In-Part of U.S. patent application Ser. No. 10/229,549, and which was filed on Aug. 28, 2002 now U.S. Pat. No. 6,688,243.

TECHNICAL FIELD

This invention relates to minimum tillage agricultural implements having furrow opening shank assemblies for forming narrow furrows, and more particularly to an agricultural implement which is useful in depositing or "shanking" fertilizer and or seeds into soil that is overburdened with agricultural residue.

BACKGROUND OF THE INVENTION

Even though the advantages of minimum tillage agricultural practices in arid and semi-arid soils have been known for some time, their adoption has been rather slow.

One of the problems associated with such practices has been the difficulty associated with providing efficient high speed implements that are capable of placing or "shanking" fertilizer and/or seeds into the soil with uniform precision when the soil is overburdened with a substantial mat or layer of agricultural residue. Heretofore, when employing prior art assemblies for this purpose, the agricultural residue will bunch, pile or "hair pin" against the furrow opening shanks requiring the implement to either be slowed down, or stopped, and the built-up residue removed by the operator from in front of the shank. This same problem becomes even more difficult when the residue is either wet or quite dense or thick. Because of these problems the prior art implements previously used require application methods that result in higher soil disturbance not conducive to minimum tillage procedures.

In addition to the shortcomings noted above, to accommodate the agricultural residue overburden, the shanks must be taller and spaced further apart, (both side-to-side on the same toolbar and front-to-back on multiple toolbars). The side-to-side limitation increases the distances between crop rows per toolbar. This, of course, requires more toolbars. The increased number of front-to-back toolbars, of course, increases the problems associated with turning the implement at the end of the crop rows. For example, when the implement is turned on a corner, or on a side hill the shanks on one toolbar will often line up with the shanks on another toolbar resulting in uneven row spacing and inefficient or duplicate application of fertilizer. Additionally, the increased number of toolbars multiplies the implement framework required to support the increased number of toolbars, thereby substantially increasing the manufacturing and maintenance costs of the implement.

Considerable effort has been expended in providing rather expensive devices, called "coulters", which are positioned forward of the shanks, and which are operable for cutting or slicing through the residue to minimize the bunching or "hair pinning" of the agricultural residue in front of the respective shanks. One such prior art device is illustrated in U.S. Pat. No. 4,762,075 and which issued on Aug. 9, 1988 to James W. Halford, and which is entitled "Seed/Fertilizer Minimum Tillage Planter". FIGS. 1–4 of the Halford patent show a prior art "coulter" design; and FIGS. 5–9 show a non-coulter design that has deflector plates 141 which are mounted to the shank 15, and which extend rearwardly and outwardly from the front edge of the shank to deflect agricultural residue (trash) laterally and rearward away from the shank 15. Such a design has the disadvantage of also deflecting some of the soil uprooted by the shank away from the shank, thereby effectively widening the furrow, and compromising the minimum tillage procedure. There are many other patents that show various "coulter" and "non-coulter" designs that are classified in Class 111 of the U.S. Patent Classification System.

Therefore, one aspect of the present invention is to provide a substantially improved, relatively high speed minimum tillage agricultural implement having furrow opening shank assemblies that are more efficient in "shanking" fertilizers or seeds into soils having substantial agricultural residue overburdens.

These and other aspects and advantages of several forms of the present invention will become apparent upon reading the following description of preferred embodiments of the invention along with viewing the drawings.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

First Form

This disclosure of the invention is submitted in furtherance of the constitutional purposes of the U.S. Patent Laws "to promote the progress of science and useful arts" (Article 1, Section 8).

Figure 1:
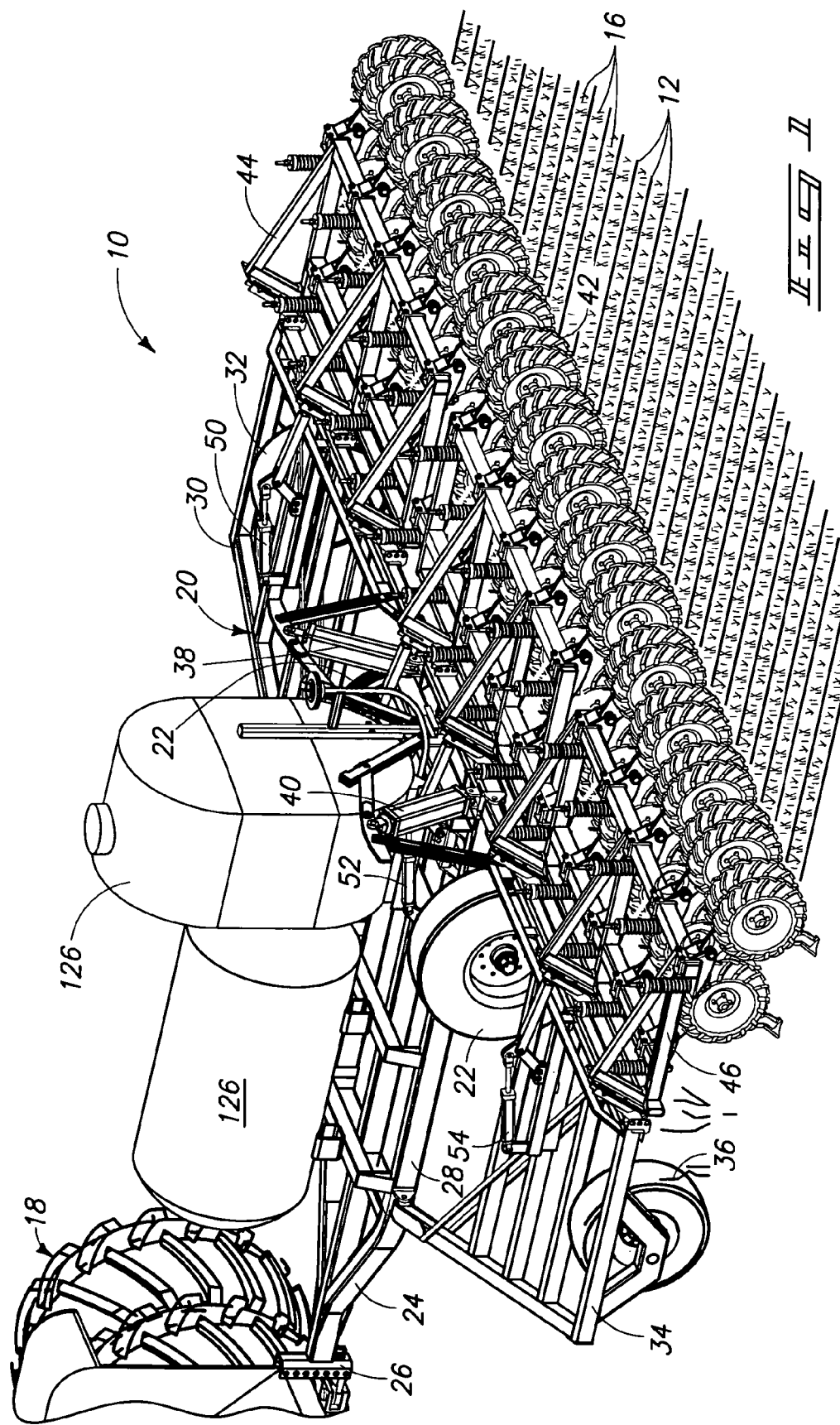
FIG. 1 is an isometric, oblique view of a first form of a preferred embodiment of an agricultural implement being pulled by a tractor and having two rows of shank assemblies mounted to implement toolbars for creating narrow furrows and depositing fertilizer in the formed furrows.

A first form of the present invention is illustrated in FIG. 1. In the first form of the minimum tillage agricultural implement which is generally designated with the numeral 10, the implement 10, is pulled by a pulling vehicle 18, such as a tractor, in the intended direction of travel, and forms a plurality of laterally spaced narrow parallel furrows 12, below ground level, in a soil 14 that is covered with agricultural residue 16 while providing low or minimum soil disturbance. Preferably the furrows 12 are laterally spaced approximately twelve to about fourteen inches on center.

The implement 10 is designed to operate efficiently and rather rapidly in a wide range of agricultural residue conditions, while providing low or minimum soil disturbance. Generally the agricultural residue comprises uncut stubble, cut stubble and other organic agricultural material remaining on the soil after crops have been harvested. It is not unusual for uncut stubble to stand twelve to thirty-six inches above ground level. Cut stubble or straw generally varies from a few inches to twenty-four inches. Generally the density of the agricultural residue varies considerably along with its moisture. A thick layer or blanket of dense, wet residue is generally much more difficult to cultivate than a light, thin layer. Frequently the density and thickness of the agricultural residue will vary considerably within a field and between fields.

The implement 10 includes a mobile framework 20 supported for travel in an intended direction by central support wheels 22. The framework 20 has a tongue 24 with a hitch 26 at a forward end thereof for releasably connecting to the rear of the pulling vehicle 18.

The mobile framework 20 includes (1) a central frame section 28 supported by the wheels 22, (2) a right wing frame section 30 supported by outrigger support wheel 32, and (3) a left wing frame section 34 supported by outrigger support wheel 36. Both the right wing frame section 30 and left wing frame section 34 are pivotally connected to the central frame section 28 for pivotal movement about longitudinal axes from "up" transport positions (not shown) to down working positions (shown in FIGS. 1 and 2). Fluid actuators 38 and 40 are operatively interconnected between frame sections 28, 30 and 34 to pivot the frame sections 30 and 34 by operator control.

Figure 2:
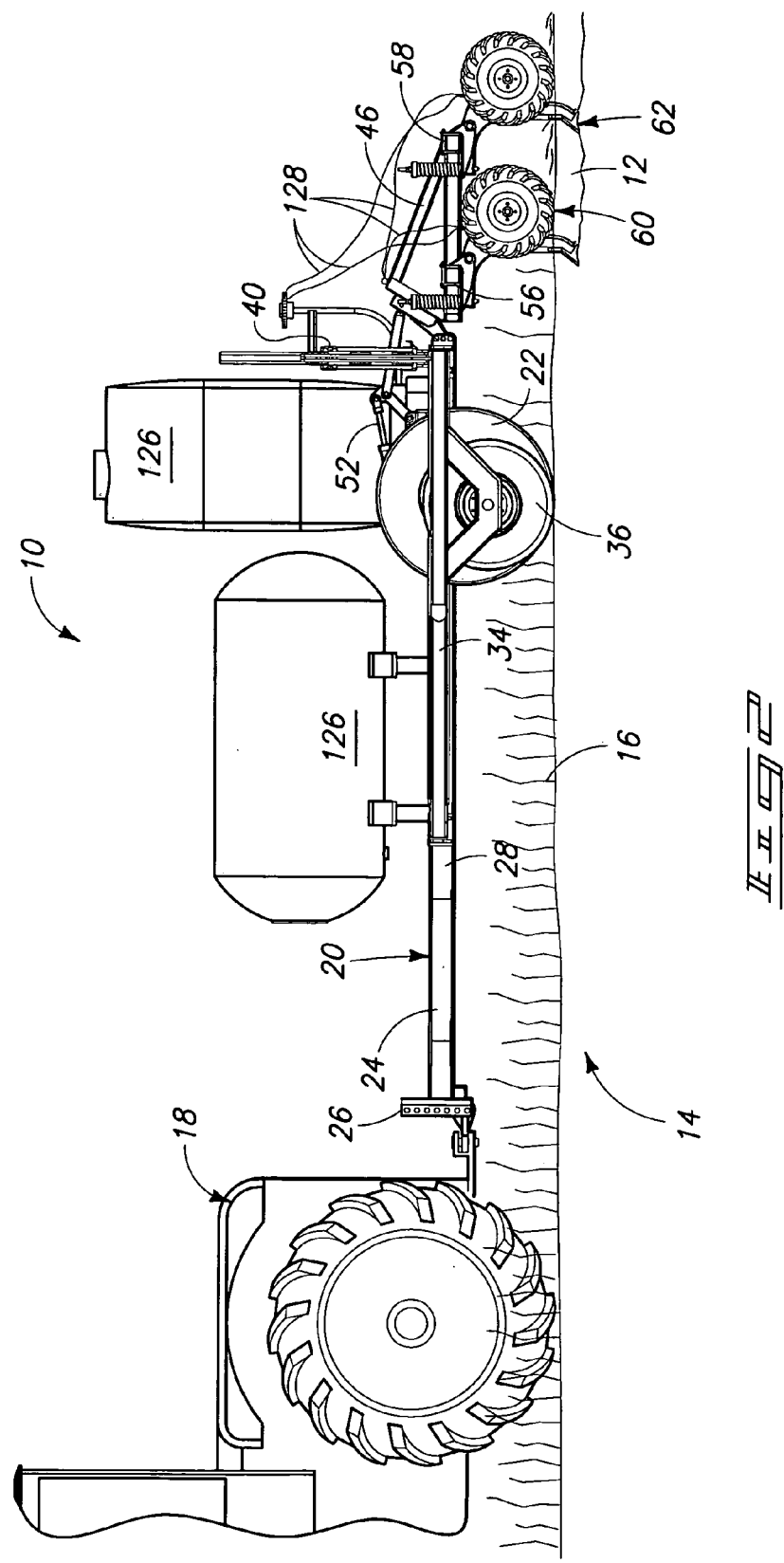
FIG. 2 is left, side elevational view of the first form of the agricultural implement shown in FIG. 1.
Figure 3:
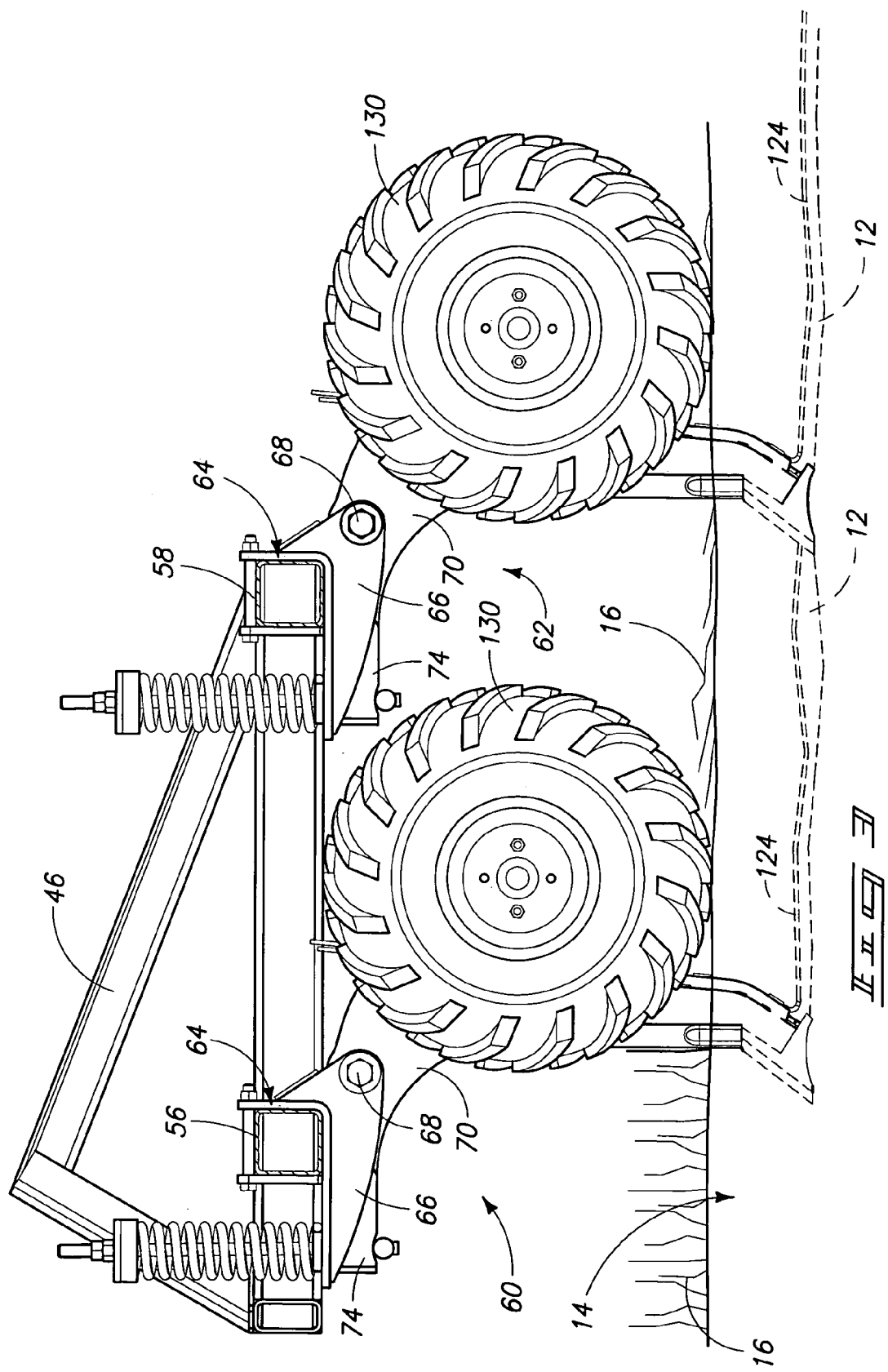
FIG. 3 is a longitudinal, vertical, cross-sectional view showing a forward shank assembly, and a rearward shank assembly of a first form of the present invention, and that are longitudinally and laterally offset with respect to each other and particularly showing the placement of residue control wheels with respect to individual shanks.

The mobile framework 20 further includes toolbar frame sections 42, 44 and 46 that are pivotally mounted to rear ends of the respective frame sections 28, 30 and 34 for pivotal movement about a generally common transverse axis between "up out of the ground" non-working positions (not shown) and "down in the ground" working positions (shown in FIGS. 1 and 2). Individual fluid actuator sub-assemblies 50, 52 and 54 are independently interconnected between the front frame sections 28, 30 and 34 and the toolbar frame sections 42, 44, and 46 to raise and lower the toolbar frame sections 42, 44, and 46 under operator control. Each of the toolbar frame sections 42, 44, and 46 carry a front row toolbar 56 and a rear row toolbar 58.

The minimum tillage agricultural implement 10 has a plurality of front row shank assemblies 60 and rear row shank assemblies 62 mounted on the respective toolbars 56 and 58 at laterally spaced intervals. The rear shank assemblies 62 are laterally interspersed between the shank assemblies of the front row. Preferably the shank assemblies 60 and 62 are evenly spaced between each other to provide evenly spaced rather close together furrows. Many farmers produce furrows that are spaced at a common spacing of approximately twelve inches on center. However, other desired spacings may be accommodated, either even or uneven.

Each of the shank assemblies 60 and 62 has a mounting bracket 64 for attaching the assembly 60, 62 to one of the toolbars 56, 58. The mounting bracket 64 includes spaced side flanges 66 and which forms a housing that extends rearwardly and downwardly. The housing supports a transverse pivot shaft or bolt 68 that defines a shank pivot axis.

Figure 7:
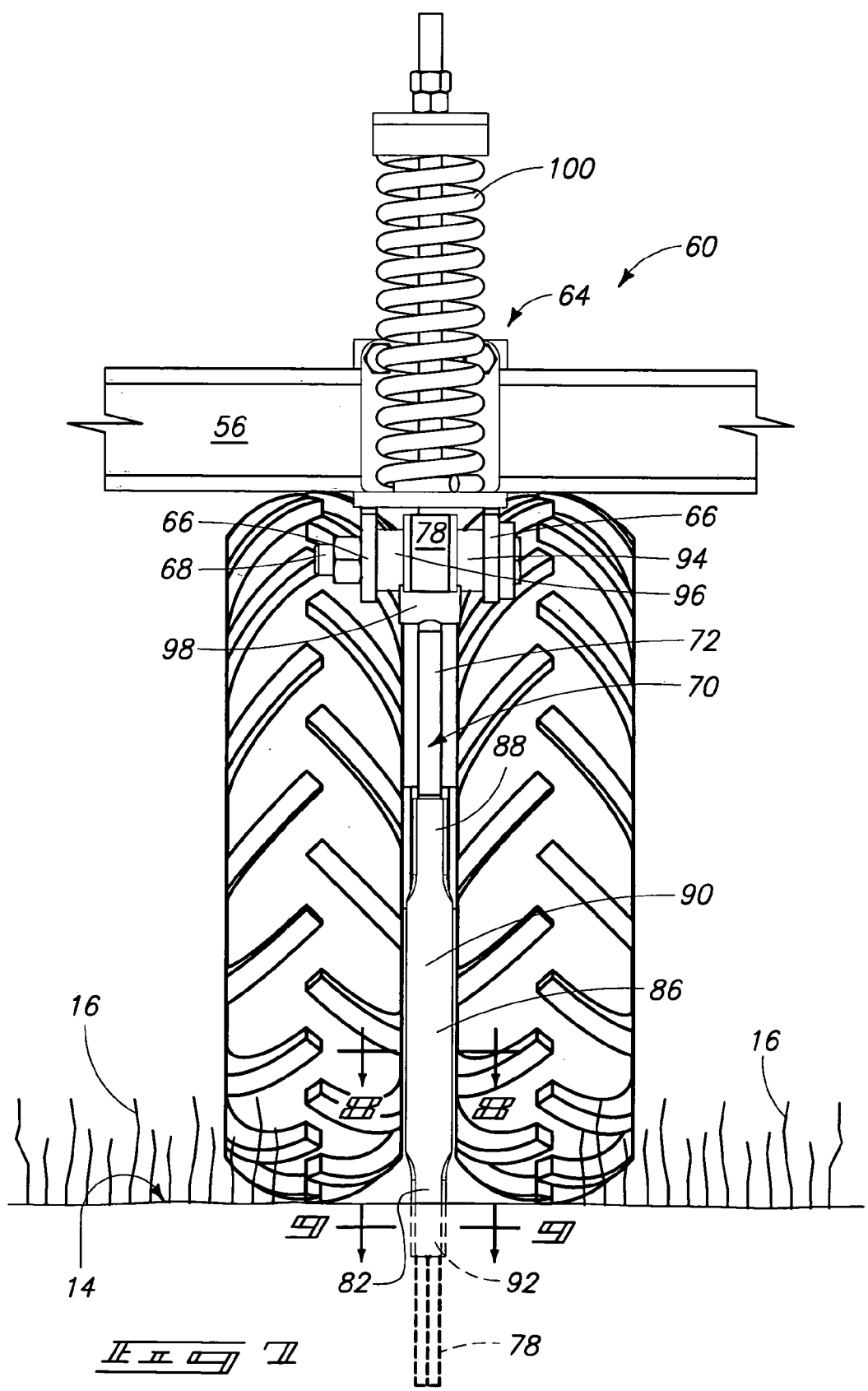
FIG. 7 is a fragmentary, vertical, front elevational view of the forward shank assembly shown in FIG. 4.

Each shank assembly 60, 62 includes an elongated narrow shank 70 that is pivotally mounted on the pivot shaft 68 for swinging movement about the shank pivot axis. The shank 70 is preferably made of a strong steel plate material of between one-half inch and one inch in thickness. The shank 70 extends from an upper end 72, through a normally upright elongated central section 76 to a lower working wear point 78. The lower working wear point 78 extends downward and forward to dislodge and lift a thin slot of soil to form the narrow furrow 12 when the toolbar frame sections are in their working positions. The upper end 72 is welded to a single shaft spacer with equally spaced sides 94 and 96 and is rotatably affixed on pivot shaft 68 and mounted between flanges 66 on mounting bracket 64 to center the narrow shank 70 relative to the attachment bracket 64 (see FIGS. 4 and 7).

Figure 5:
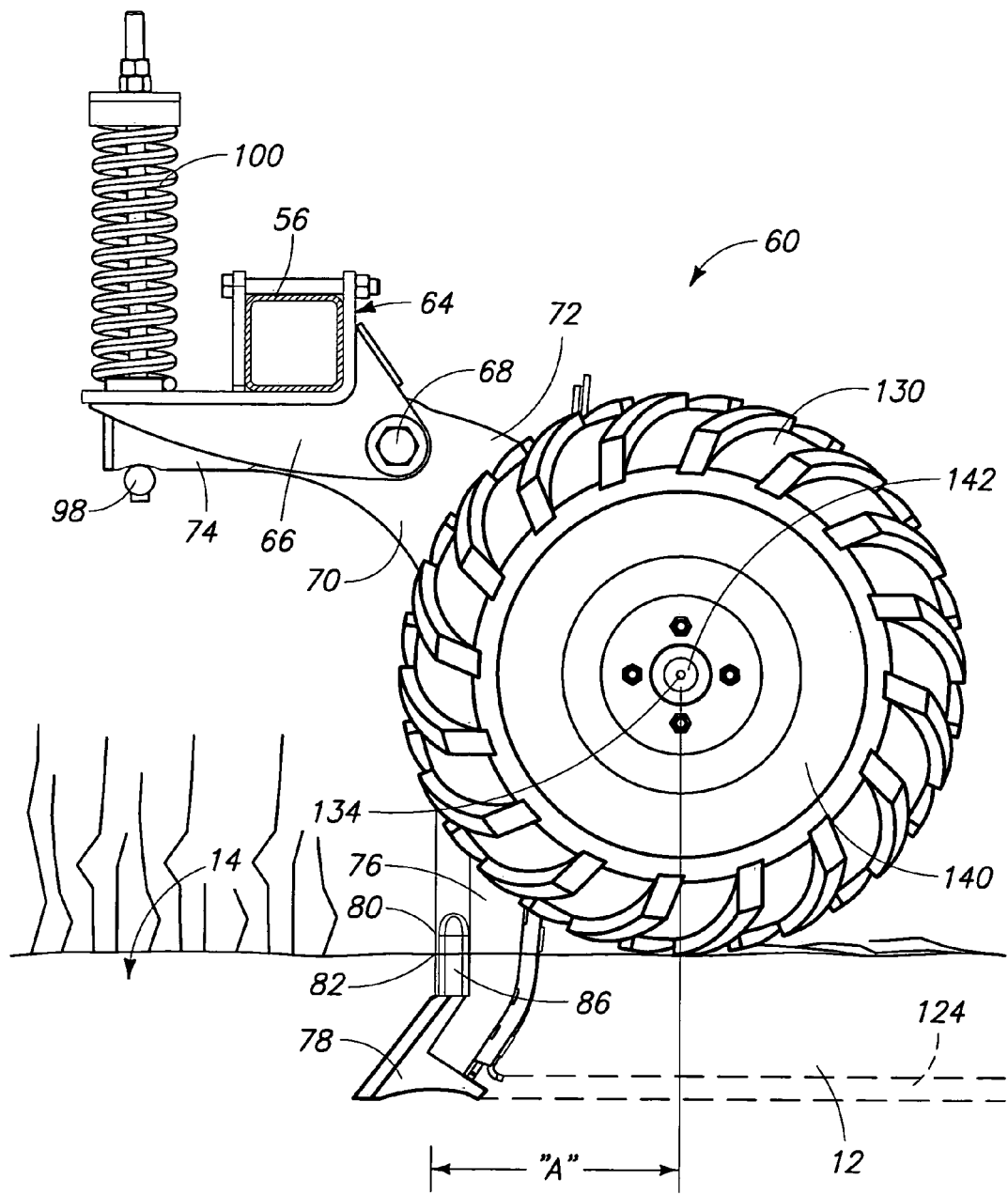
FIG. 5 is a fragmentary side elevational view of the forward shank assembly shown in FIG. 4.

The upper end 72 of the shank 70 has a forward projection 74 that projects forward of the pivot shaft 68 and underneath the mounting bracket 64. The shank assemblies 60, 62 have spring bias mechanisms, or resilient movement limiting assemblies, that engage the forward projections 74 to normally bias the shanks 70 to their downward working positions as illustrated in FIGS. 2 and 5, while simultaneously enabling the shanks 70 to pivot upward about the axes of the pivot shafts 68 should the shanks 70 encounter a substantial obstruction. As soon as the shank 70 clears the obstruction the spring biasing mechanisms automatically returns the shank 70 to its normal working position.

The spring biasing mechanism, or resilient movement limiting assembly includes a yoke or connector rod assembly 98 that is operatively interconnected between the forward projection 74 and the bracket 64 to restrict the movement of the shank 70. A compression spring, or resilient movement limiting member 100 is mounted on the bracket 64 and engages the yoke or connector rod assembly 98 to spring bias the forward projection 74 clockwise as illustrated in FIGS. 2 and 5 to maintain the shank 70 in its normal working position.

The upright elongated central section 76 of the shank 70 has a narrow leading edge 80 intended to engage the agricultural residue immediately in front of the shank 70. The leading edge 80 extends downward from the upper end 72 to a front edge reference segment 82 that engages the soil at ground level (See FIG. 5). The working point 78 extends downward and forward from the front edge segment 82 for forming the narrow furrow.

Figure 8:
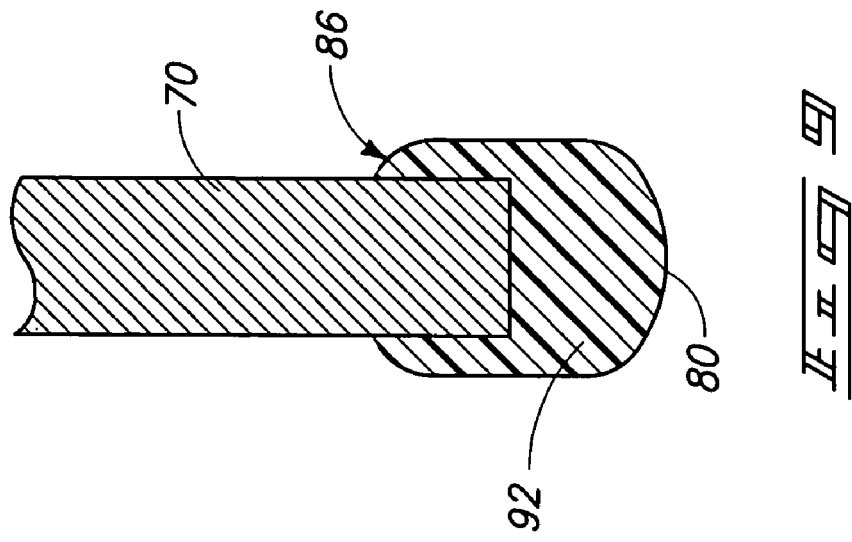
FIG. 8 is a fragmentary, horizontal, cross-sectional view of the first form of the present invention, and which is taken from a position along line 8—8 in FIG. 7, and which illustrates a cross-sectional view of a central portion of a wear-resistant front edge of the shank.
Figure 9:
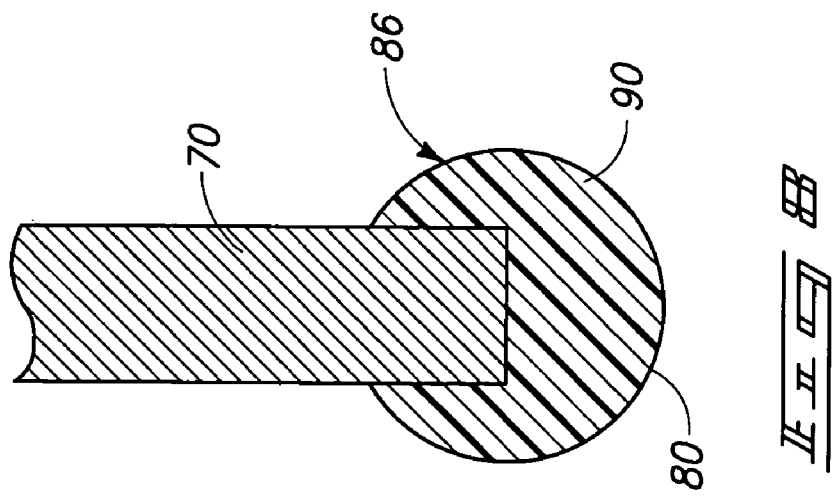
FIG. 9 is a fragmentary, horizontal, cross-sectional view taken along line 9—9 in FIG. 7, and showing the cross-sectional view of the lower portion of the wear-resistant front edge of the shank.

As seen in the drawings, the leading edge 80 is a narrow wear-resistant deflector 86 formed from a low coefficient of friction plastic material to minimize build-up of residue and soil along the leading edge 80. Preferably, the plastic deflector 86 is formed from a high density molecular weight (UHMW) plastic material that is often used for low-coefficient of friction bearing material. Preferably, the deflector 86 has a "C" shaped cross-section as illustrated in FIGS. 8 and 9. The deflector 86 has a central body 90 with necked down or thinner upper and lower ends 88 and 92 respectively. Preferably, the necked down lower end extends below the front edge reference segment 82 and into the soil at ground level.

Figure 4:
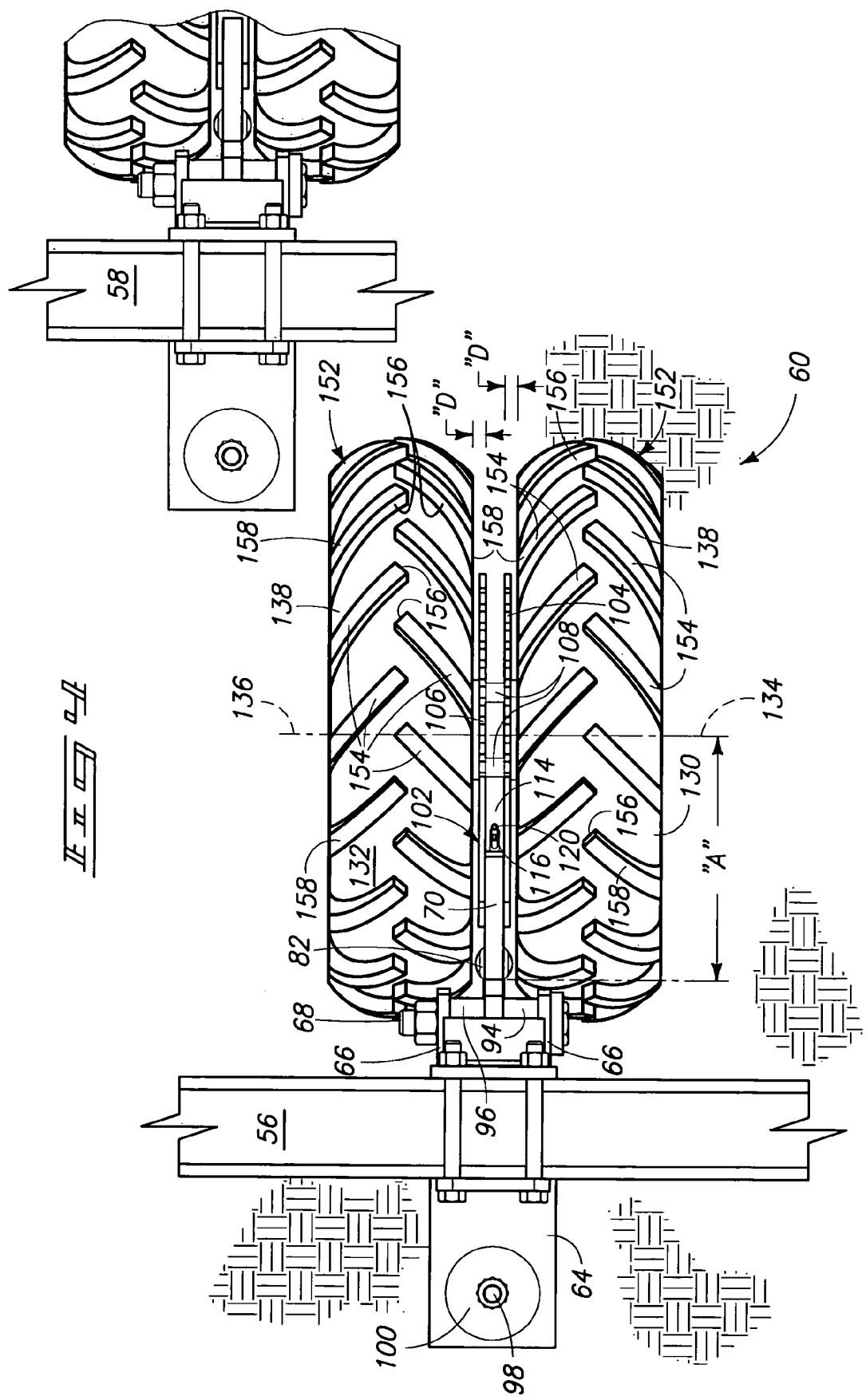
FIG. 4 is a fragmentary, top plan view of the forward shank assembly shown in FIG. 3, and showing the forward shank assembly with a pair of residue control wheels straddling the illustrated shank.
Figure 6:
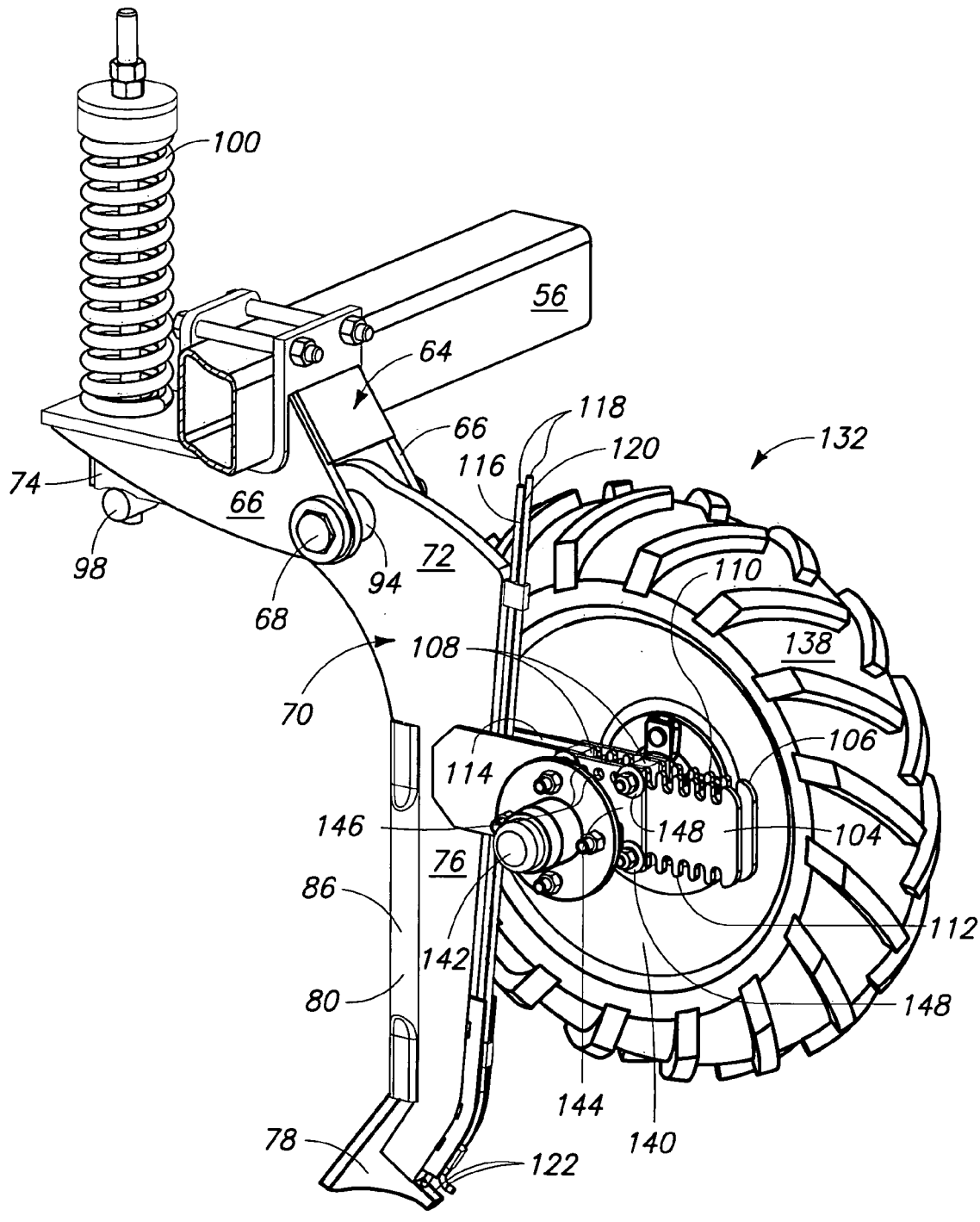
FIG. 6 is a fragmentary, oblique, isometric view similar to that seen in FIG. 5, with a left residue control wheel removed, and illustrating the details of a residue wheel support bracket relative to a respective shank.
Figure 10:
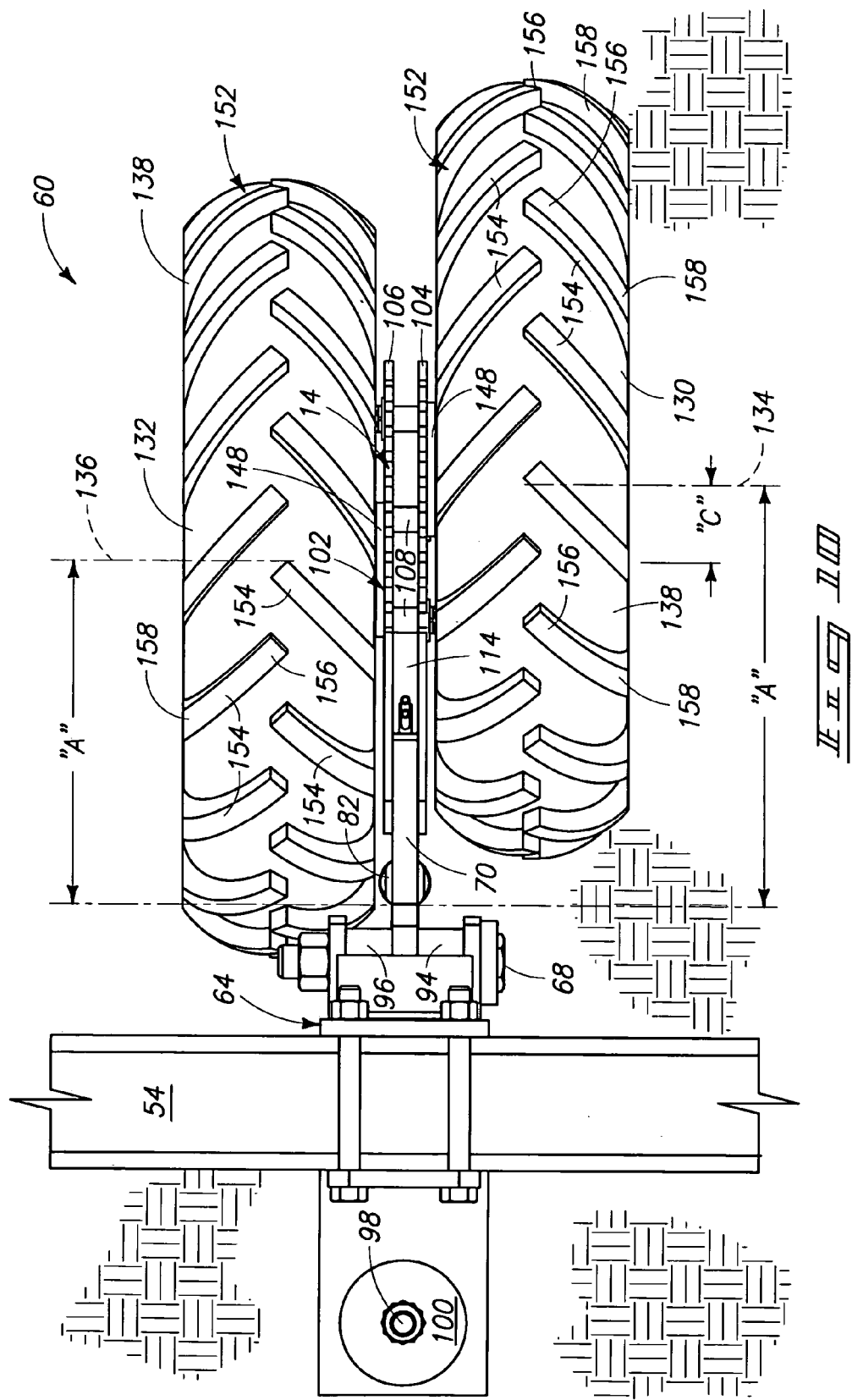
FIG. 10 is a fragmentary, plan view of an alternate shank assembly for use in the first form of the invention, and in which the residue control wheels are longitudinally offset with one wheel being forward of the other.
Figure 11:
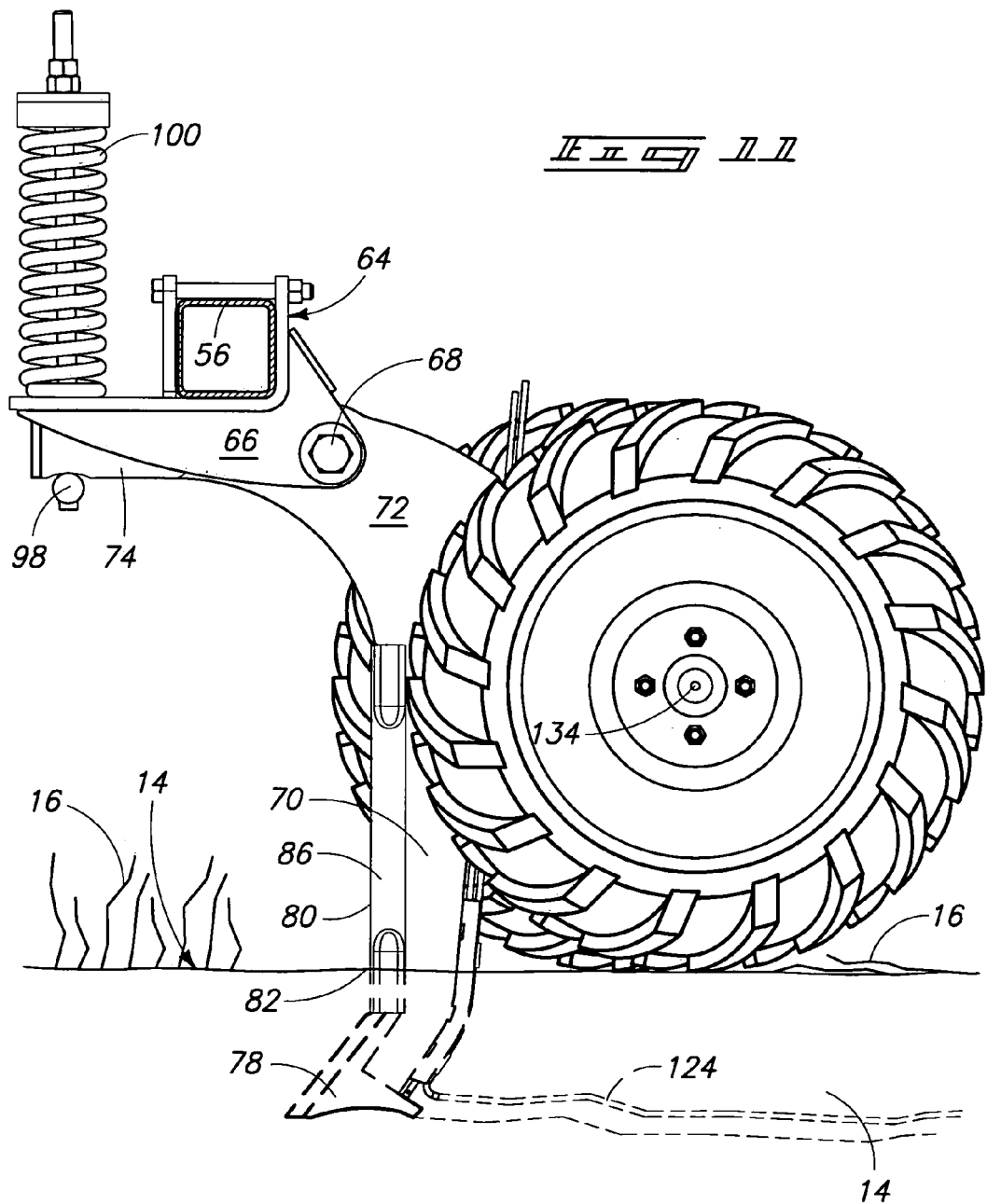
FIG. 11 is a fragmentary, side elevational view of the alternate shank assembly as shown in FIG. 10, and further illustrating the residue control wheels being longitudinally offset with one wheel being forward of the other.
Figure 12:
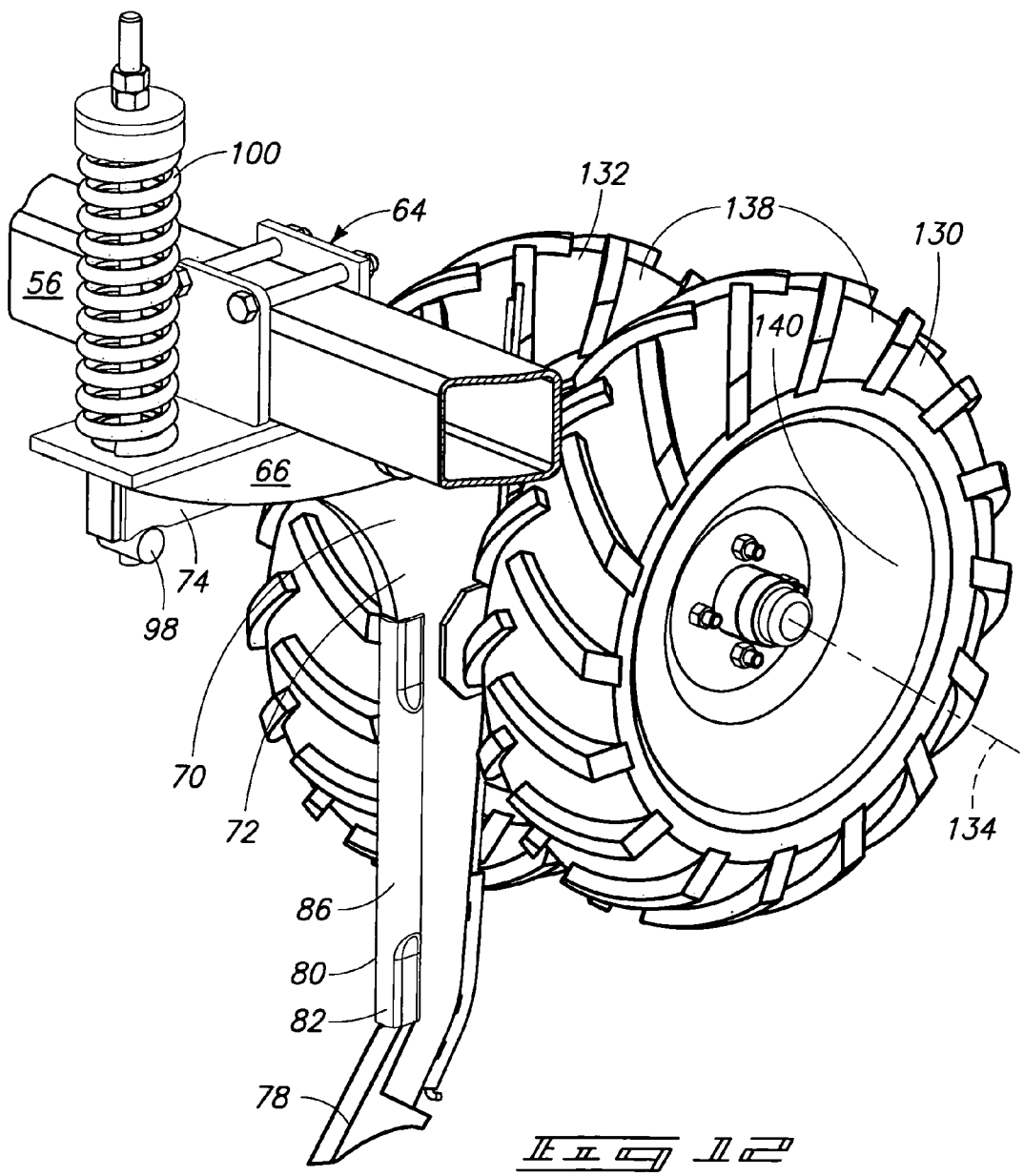
FIG. 12 is a fragmentary, isometric, oblique view of the shank assembly shown in FIG. 11, and further illustrating the offset residue control wheels from a different perspective.

At least one of the shanks 70 (and preferably a majority or all of the shanks 70) has a residue control wheel support bracket 102 affixed to the shank 70, and extending rearwardly therefrom as illustrated in FIGS. 4, 6 and 10. Preferably the support bracket 102 has side wings or plates 104 and 106 which are affixed to the sides of the central section 76 of the shank 70. Apertured spacers 108 are positioned between plates 104 and 106, and disposed rearwardly of the shank 70 to maintain a desired bracket rigidity and spacing between the plates 104 and 106 and rearwardly of the shank 70.

The plates 104 and 106 have rows of complementary spaced upper and lower vertical mounting slots 110 and 112 formed therein at desired intervals rearward of the shank 70. Immediately rearward of the shank 70 a multi-tube opening 114 is formed between the plates 104 and 106 to allow elongated fertilizer tubes 116 and 120 to conveniently extend downward from upper ends 118 to lower ends 122 (FIG. 6) along a rear edge of the shank 70. Preferably the lower ends 122 extend downward below the front edge reference segment 82 to deposit fluid fertilizers into the narrow furrow 12 rearward of the working point forming a fertilizer band 124 in the narrow furrow 12. The fertilizers are stored in fertilizer containers 126 supported on the mobile framework 20 and distributed to the tubes 116 and 120 through distribution lines 128 (FIG. 2).

One or more of the shank assemblies 60 and 62 (and preferably a vast majority) has a set of rotatable residue control wheels 130 and 132 that are mounted to the residue control wheel support bracket 102. The residue control wheels 130 and 132 straddle the shank 70 for engaging the soil and agricultural residue, and efficiently stabilizing the soil and residue by pushing or urging it downward, and underneath the wheels 130 and 132 and away from the shank 70 to prevent the soil and agricultural residue from building up along the leading edge 80 of the shank 70.

Each of the wheels 130 and 132 has a prescribed diameter. Applicant has found that wheels having diameters of between 16 and 26 inches work with a great deal of success, although other diameters may be employed. Each of the wheels 130 and 132 has a pneumatic tire 138 that is mounted on a rim 140. The rims 140 are mounted on hubs 142 that are in turn rotatably mounted to axle plates 144. Each axle plate 144 has apertures 146 formed therein that are spaced complementary to the spacing of the bracket slots 110 and 112. The axle plates 144 are securely mounted to the bracket 102 by mounting bolts 148. The spacing and number of slots 110 and 112 and apertures 146 enable the plates 144 to be adjustably mounted at various desired distances rearward of the shank 70.

The wheel 130 rotates about transverse axis 134 and wheel 132 rotates about transverse axis 136. In one embodiment the axes 134 and 136 are coaxial and in a second embodiment the axes 134 and 136 are offset in the direction of travel.

Each of the wheels 130 and 132 are mounted to the wheel support bracket 102 with their respective rotational axes 134 and 136 positioned rearward of the front edge reference segment 82 in the direction of travel, a distance "A", as illustrated in FIGS. 4, 5 and 10, of less than the diameters of the wheels 130 and 132, respectively. Preferably, the distance "A" is less than about three-quarters of the diameter of the respective wheels 130 and 132. Most preferably, the distance "A" is between about one-quarter and three-quarters of the diameter of the individual wheels 130 and 132.

Figure 13:
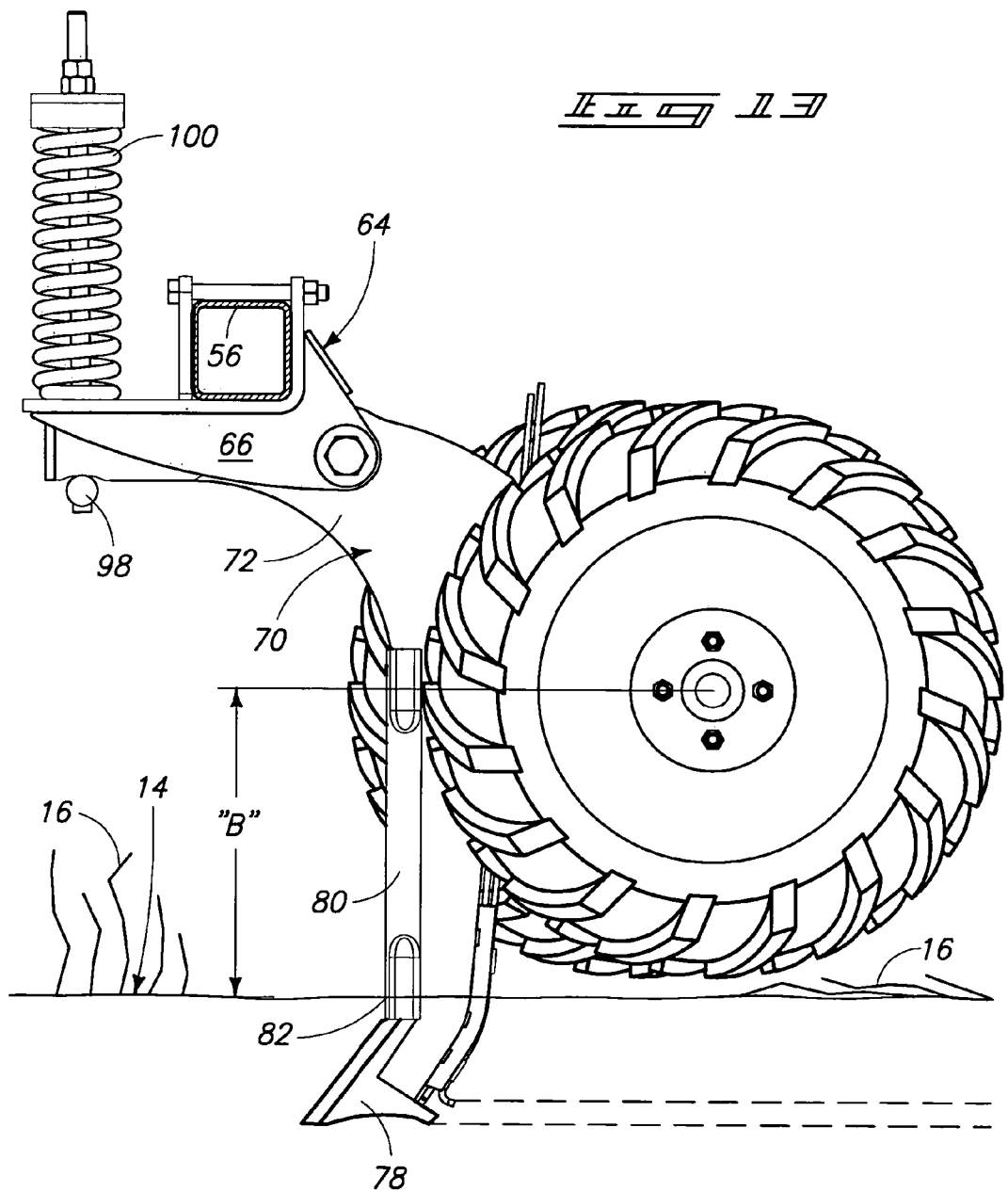
FIG. 13 is a fragmentary, side elevational view of another embodiment of a shank assembly illustrating the residue control wheels being elevated above ground level.

Additionally, each of the wheels 130 and 132 are mounted to the wheel support bracket 102 with their respective axes 134 and 136 positioned elevationally above the front edge reference segment 82 a vertical distance "B", as illustrated in FIG. 13 of between about three-eights and three-quarters of the diameter of the wheels 130 and 132, respectively. Preferably, the vertical distance "B" is between about seven-sixteenths and eleven-sixteenths of the diameter of the wheels 130 and 132, respectively. Most preferably, the vertical distance "B" is between about one-half and eleven-eighteenths of the diameter of the wheels 130, 132, respectively.

In an alternate embodiment, the wheels 130 and 132 are offset with respect to each other so that one wheel such as 132 is forward of the other wheel 130 as illustrated in FIGS. 10–14. In such an embodiment the leading wheel 132 becomes the more dominant wheel most frequently processing and controlling a majority of the agricultural residue.

In the offset configuration, the offset distance "C" (FIG. 10) is less than one-third of the diameter of the forward wheel 132. Preferably, the offset distance "C" is between one-twelfth and one-fifth of the diameter of forward wheel 132.

Furthermore, it should be noted that the wheels 130 and 132 straddle the shank 70 with the sides of the wheels 130 and 132 being in close proximity to the sides of the shank 70.

Preferably the wheels 130 and 132 are laterally spaced immediately adjacent the side walls of the shank 70. Preferably the wheels 130 and 132 are spaced lateral distances "D", as illustrated in FIG. 4, of less than width of the wheels 130 and 132, respectively. Most preferably, the lateral distances "D" are less than about one-half the width of the wheels 130 and 132, respectively.

As previously mentioned, each of the wheels 130 and 132 preferably has a pneumatic tire 138 for stabilizing and otherwise urging or pushing the engaged soil and agricultural residue downwardly and then under the tire and away from the shank 70. As illustrated, each of the tires 138 has a traction tread 152 with a plurality of inclined lugs 154 that extend generally outward and forward relative to the direction of rotation from an inner end 156 adjacent a center of the tire 138 to an outer end 158 near the outer edge of the tire 138.

Figure 14:
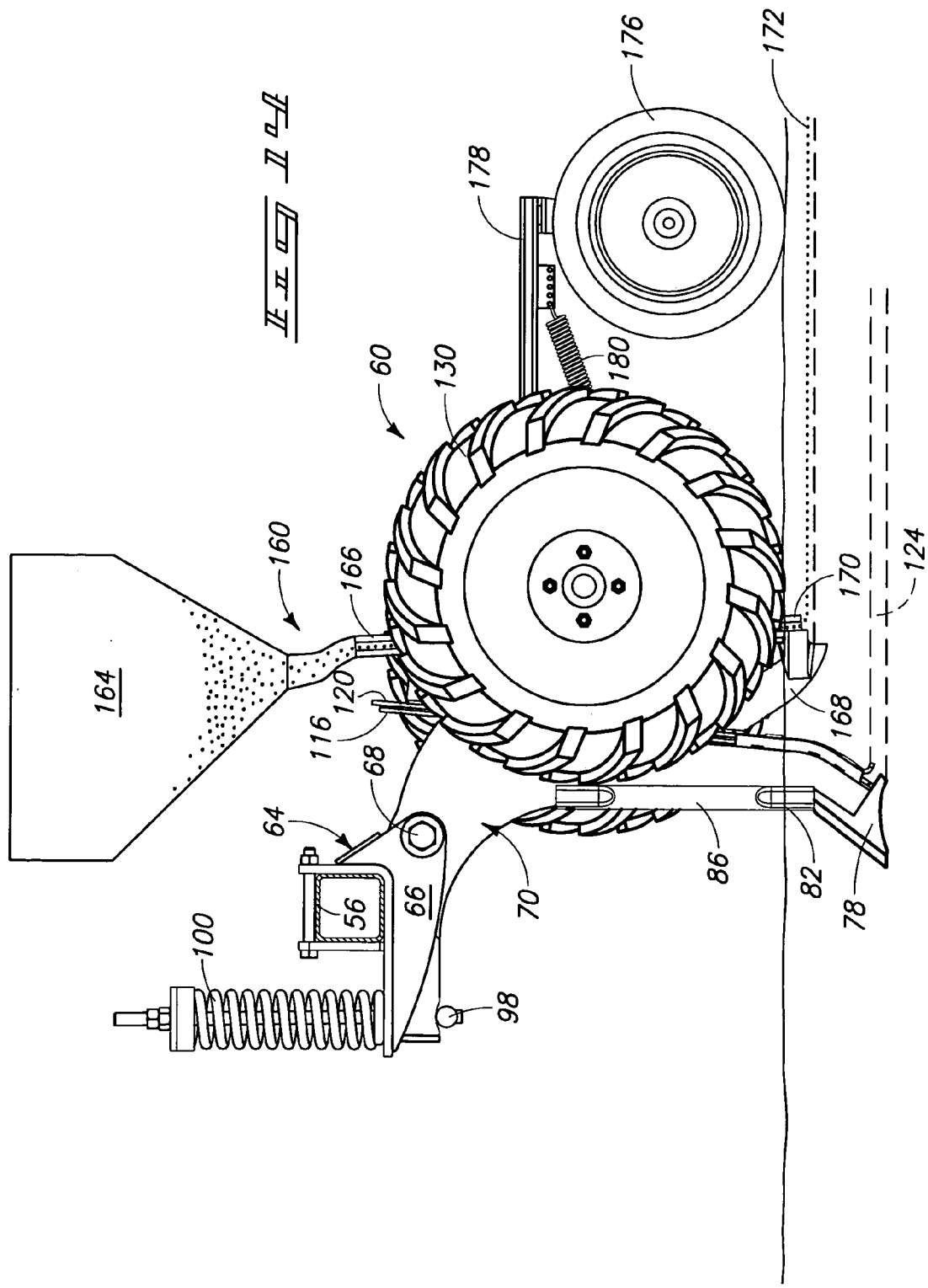
FIG. 14 is a fragmentary, side elevational view similar to that seen in FIG. 7, and showing a further alternate embodiment in which the shank assembly is adapted to deposit seeds in the furrow which is being formed.
Figure 15:
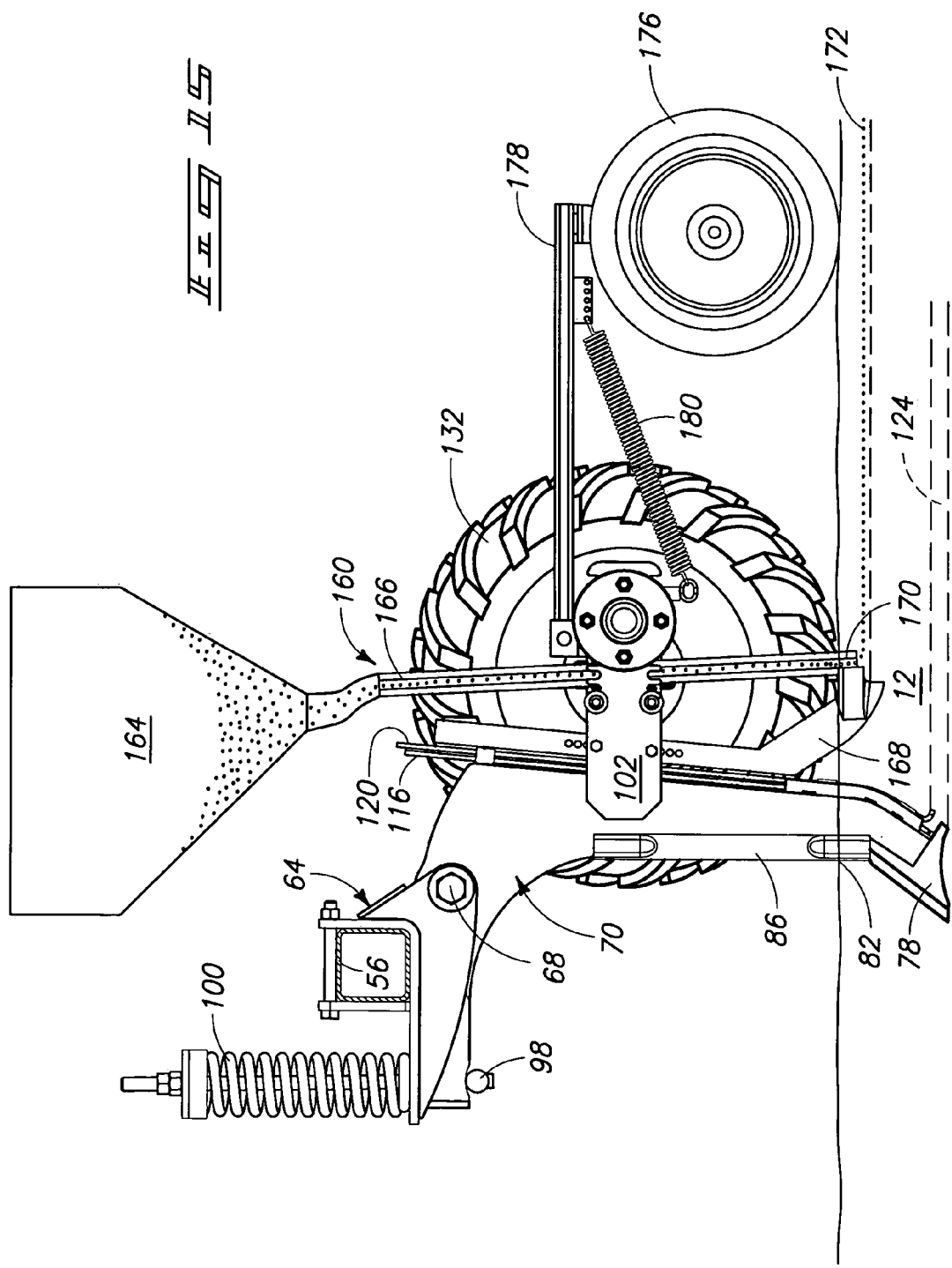
FIG. 15 is a fragmentary, side elevational view similar to that seen in FIG. 14, with a residue control wheel removed to illustrate the details of a seed delivery attachment which is utilized in the first form of the invention.

In a still further embodiment, the implement 10 has a seed planter attachment 160, as illustrated in FIGS. 14 and 15. The seed planter attachment 160 includes a seed supply 164 that is mounted on the mobile framework 20. Seeds from the supply 164 are distributed through seed distribution conduit 166 to a seed conduit support shank 168 that is adjustably mounted to the support bracket 102. The seed conduit 166 extends downwardly along the shank 168, and terminates at a lower end 170 of the shank 168. The seed conduit extends downwardly into the narrow furrow 12 for depositing seeds in a seed zone 172 above the fertilizer band 124. Preferably, the seed planter attachment 160 includes a furrow press wheel 176 that is mounted on a support arm 178 that extends generally rearwardly from the support bracket 102, and in substantial longitudinal alignment with the furrow 12. A tension spring 180 is connected to the support arm 178 to bias the arm 178 and the press wheel downwardly and firmly into contact with the loosened soil to compact the loosened soil into the furrow to close the furrow and cover the fertilizer band 124 and the resulting seed zone 172.

Second Form

Figure 16:
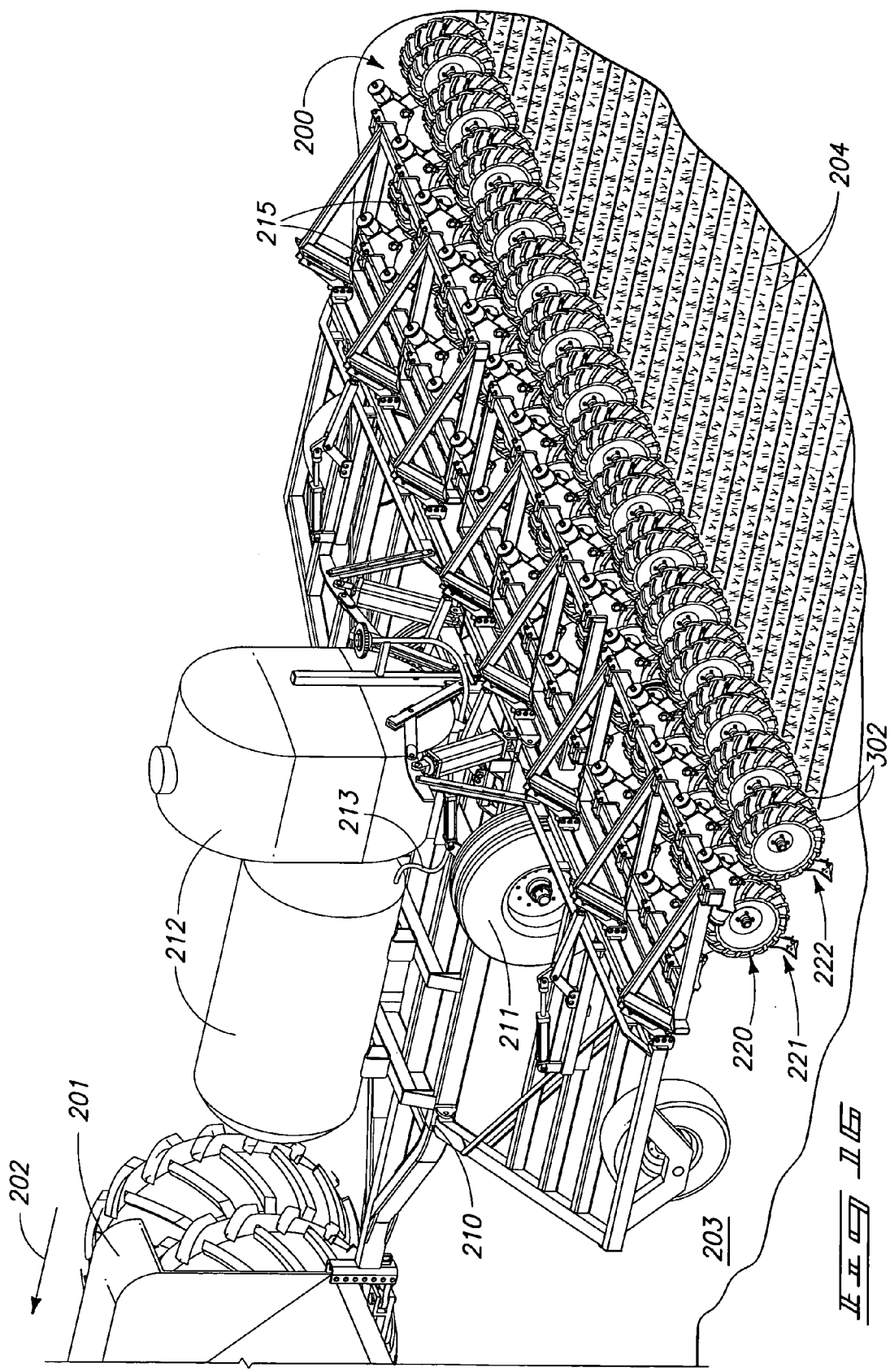
FIG. 16 is an isometric, environmental view of a second form of the present invention being pulled by a tractor, and having a plurality of shank assemblies mounted to implement toolbars for creating narrow furrows and which is operable to deposit either fertilizer, or seed in the formed furrows.

Referring now to FIG. 16 a second form of the present invention 200 is illustrated. In the second form of the invention which is useful for minimum tillage agricultural practices, the implement 200 is pulled by a overland vehicle such as a tractor 201 in an intended direction of travel 202 over a soil surface 203 which is to experience tillage. The second form of the invention forms a plurality of laterally spaced narrow parallel furrows 204, in the soil which is covered with agricultural residue as earlier disclosed.

The second form of the invention 200 is designed to operate in a manner similar to the first form of the invention, that is, it is operable to impart minimum tillage to the soil 203 under a wide range of agricultural residue conditions. The second form of the invention 200 includes a mobile frame 210 which is supported for travel in the intended direction 202 by at least two earth engaging wheels 211 which support the frame in spaced rolling engagement relative to the soil 203. As illustrated in FIG. 16, a tank 212 is borne by the frame and is operable to dispense a liquid fertilizer to the soil. As best appreciated by a study of FIG. 16 and FIG. 18, a conduit 213 is provided and which is coupled in fluid flowing relation relative to the tank 212. The conduit 213 has a distal end 214 which is mounted on the shank and is disposed in trailing relation relative to the intended direction of travel 202 of the mobile frame 210. As should be understood, a liquid fertilizer dispensed by the tank exits the distal end 214 of the conduit 213 and is deposited onto the adjacent soil 203. The mobile frame 210 includes a plurality of toolbars 215 which are mounted in substantially transverse relation relative to the intended direction of travel 202 of the mobile frame 210. As was the case with the first form of the invention 10, the respective plurality of toolbars 215 are movably mounted on the mobile frame 210 so as to permit the shanks and associated earth engaging wheels, which will be discussed below, and which are mounted on same, to be moved out of contact with the soil such that the second form of the invention may be readily moved to various field locations. These movements of the toolbars are effected by various hydraulic cylinders in a fashion similar to that described with the first form of the invention. Therefore, for purposes of brevity, further discussion regarding this aspect of the second form of the invention is not warranted.

Figure 17:
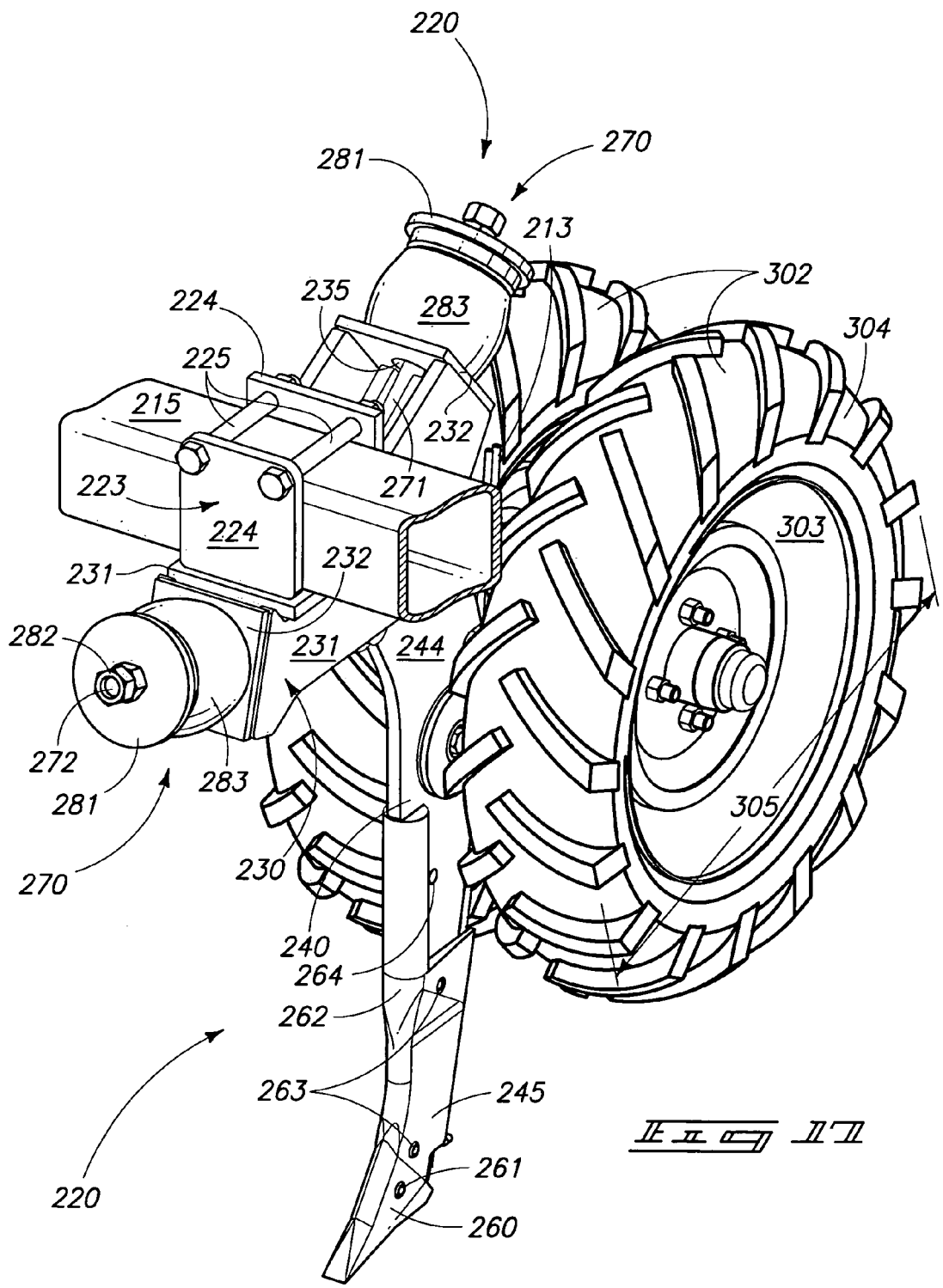
FIG. 17 is an fragmentary, perspective view of the second form of the agricultural implement shown in FIG. 16.
Figure 18:
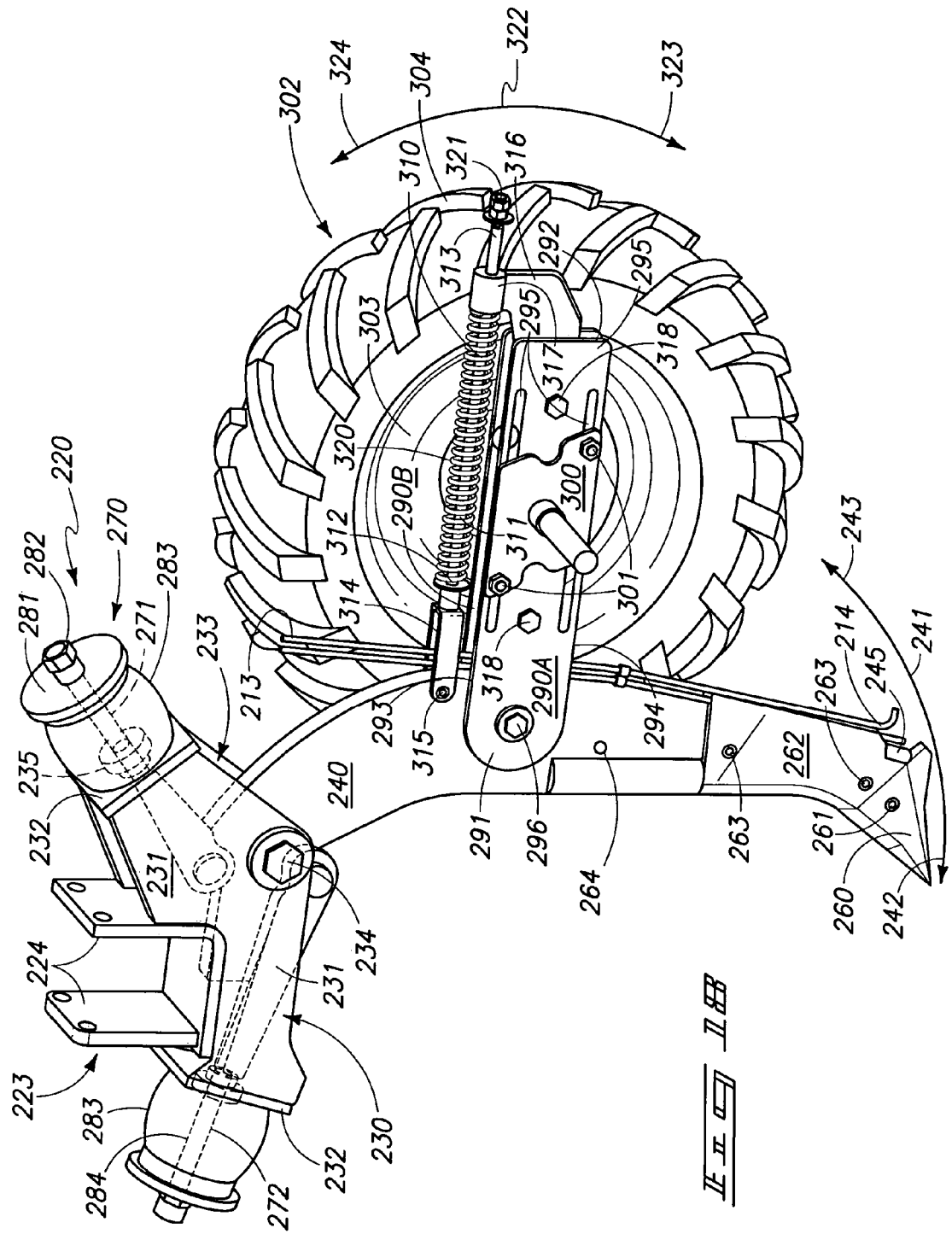
FIG. 18 is a fragmentary, side elevational view of the second form of the present invention with one tire removed in order to show the structure thereunder.

Referring now to FIGS. 17 and 18, a plurality of shank assemblies which are generally indicated by the numeral 220 are mounted on the respective toolbars 215 at laterally spaced intervals. As seen in FIG. 16, a first or front row of shank assemblies 221 is provided and which are laterally interspersed between the shank assemblies 220 which make up the second or rear row 222. The respective shank assemblies 220 are typically evenly spaced between each other to provide closely formed furrows 204. As earlier discussed, many farmers produce furrows that are spaced at a spacing of approximately twelve to about fourteen inches on center. However, the present form of the invention 200 may accommodate other desired spacings which may be either even or uneven.

Figure 20:
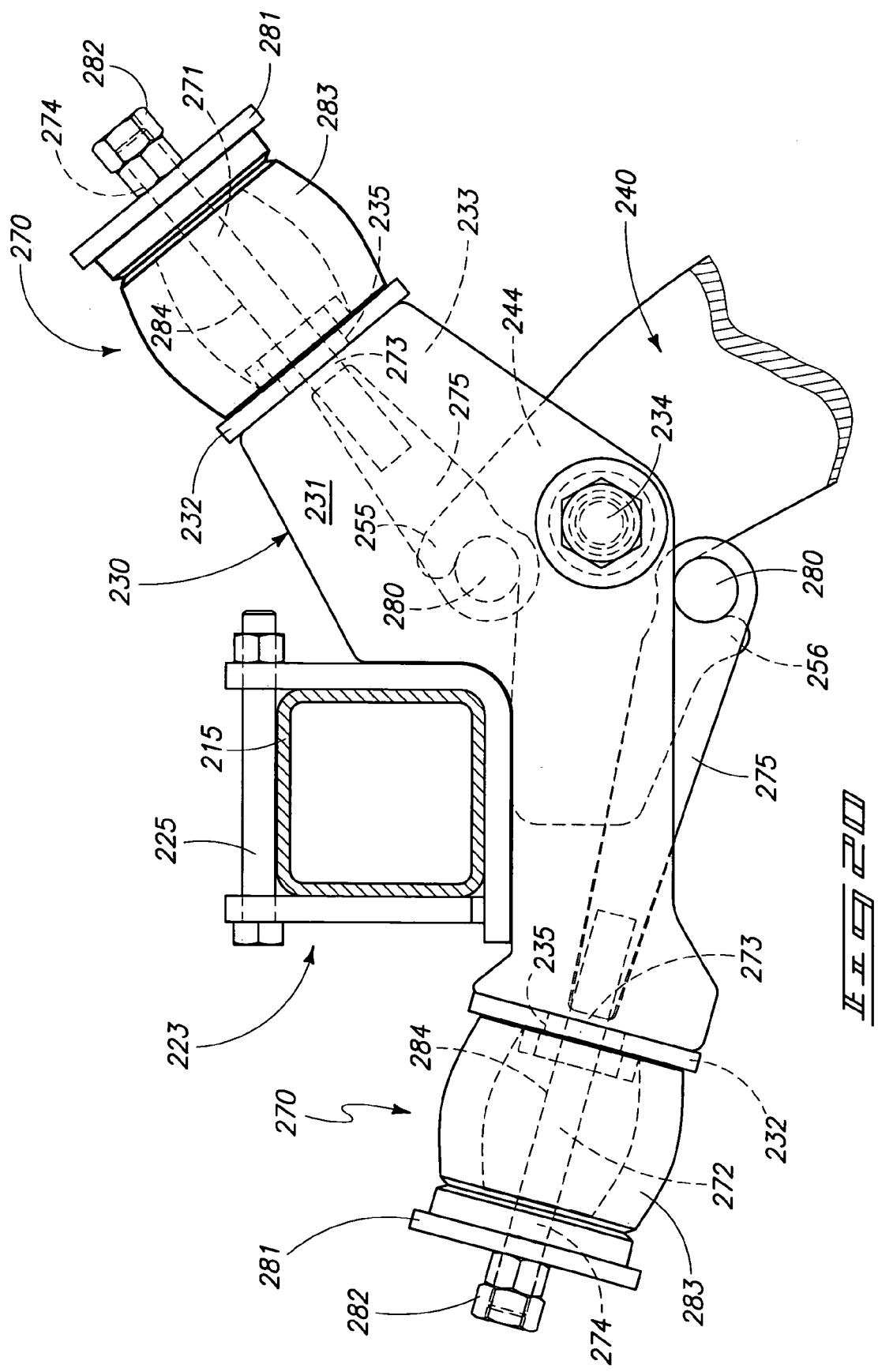
FIG. 20 is a fragmentary, side elevational view of the second form of the present invention with some underlying surfaces shown in phantom lines.

Referring now to FIG. 18, the respective shank assemblies 220 which are interspersed along the individual toolbars 215 each include a mounting bracket which is generally indicated by the numeral 223. The mounting bracket is defined by a pair of spaced flanges 224 which extend generally normally upwardly relative to the shank assembly 220 and which receive a fastener 225 therethrough (FIG. 17) and which secures the shank assemblies 220 to the respective toolbars at given locations. Each of the respective shank assemblies 220 includes a housing 230 which is secured by welding or the like to the mounting bracket 223. The housing is defined by a pair of spaced sidewalls 231. Still further, the spaced sidewalls are further joined together by a pair of end walls which are generally indicated by the numeral 232 (FIG. 17). The pair of spaced sidewalls 231, and spaced end walls 232 forming the housing 230 define a cavity 233 (FIG. 20) which is operable to receive, at least in part, a shank for rotatable movement as will be discussed, below. The pair of spaced sidewalls are operable to receive a bolt or other fastener 234 therethrough and which defines a pivot axis about which the shank will rotate. Still further, and as best seen in FIG. 17 and 20, an aperture 235 is formed in each of the end walls 232, and is operable to slideably receive a rod therethrough and which will be discussed in greater detail hereinafter.

Figure 19:
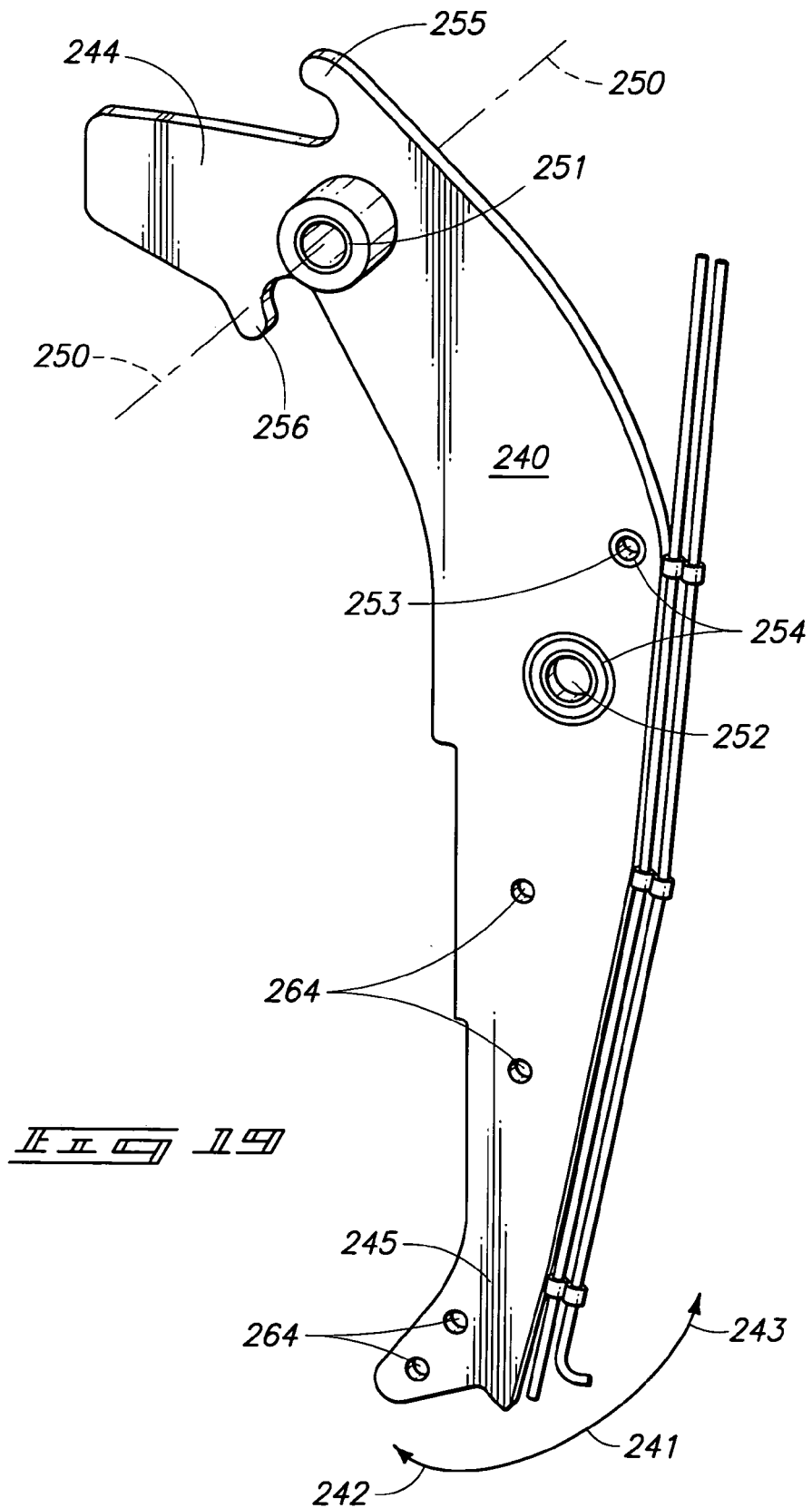
FIG. 19 is a fragmentary, side elevational view of the shank utilized with the second form of the present invention.

Referring now to FIGS. 18 and 19, each shank assembly 220 includes an elongated narrow shank 240 that is rotatably or pivotally mounted for movement on or about the fastener 234 and is moveable along an arcuately shaped path of travel 241 between a first, soil engaging position 242, to a second position 243 wherein the shank 240 is moved away from the first position 241 such as might be the case where the shank 240 strikes an obstruction in the soil 203. As will become evident from the discussion which follows, the shank 240 is biased along the path of travel in the direction of the first position 242 as seen in FIG. 18. The arcuately shaped path of travel 241 defines a path of movement for the shank which is less than about 40 degrees of rotation relative to the pivot axis as defined by the fastener 234.

Referring now to FIG. 19, the shank 240, as shown, includes a first end 244 and an opposite second end 245. The shank 240 includes an axis of rotation 250 which is positioned near the first end 244. The shank further is rendered rotatably moveable along the arcuately shaped path of travel 241 by means of an internal wear bushing which is generally indicated by the numeral 251. As should be understood, the bolt or fastener 234 is received through the internal wear bushing. Located intermediate the opposite first and second ends 244 and 245, are first and second apertures generally indicated by the numeral 252 and 253, respectively. As seen in FIG. 19, each of the respective apertures 252 and 253 receives a bushing which is generally indicated by the numeral 254. As should be understood, the first and second apertures are operable to receive fasteners therethrough which permit a mounting bracket to rotate along a second arcuately shaped path of travel, as will be discussed hereinafter. As seen in FIG. 19, the first end 244 of the shank 240 defines a first and second hook region 255 and 256, respectively. The hook regions are disposed in radially, outwardly, spaced relation relative to the axis of rotation 250. As seen in FIG. 18, the shank 240 includes a lower earth engaging or working wear point 260 which is fastened to the shank by a suitable fastener 261. Yet further, the shank 240 includes a replaceable guard which is generally indicated by the numeral 262, and which is also attached to the shank by means of fasteners 263. The respective fasteners are received through the several apertures 264 which are formed in the shank 240 (FIG. 19).

As alluded to earlier in this application, the respective shank assemblies 220 are biased along their respective arcuately shaped path of travel 241 into a downward soil engaging or working position 242, but are enabled by means of the axis 250 to move along the path of travel 241 between the first position 242, and the second position 243 should the shank 240 encounter a substantial obstruction in the soil. As will be appreciated, as soon as the shank 240 clears the obstruction, a resilient movement limiting assembly 270, as will be described hereinafter, automatically returns the shank 240 to its working position which is near the first position 242. The resilient movement limiting assembly allows for movement along the arcuately shaped path of travel 241 when application of a force of greater than about 500 pounds is applied to the distal or second end 245 of the shank 240. This application of force causes an associated resilient movement limiting member, which will be discussed hereinafter, to compress and thus permit movement of the shank between the first and second positions 242 and 243, respectively. As earlier discussed, the arcuately shaped path of travel 241 is limited to about 40 degrees of rotation relative to the axis 250.

As best seen by reference to FIG. 20, the resilient movement limiting assembly 270 includes first and second rods 271 and 272, respectively. Each of the rods has a first end 273 which is disposed in force transmitting relation relative to the first end 244 of the shank 240; and an opposite, second end 274 which is disposed in forced receiving relation relative to a resilient movement limiting member as will be described below. Each of the first and second rods has a yoke portion 275 which is mounted to the first end 244. A rod or other fastener 280 is received through the yoke portion, and is operable to transmit force to the respective first and second hook regions 255 and 256, which are defined by the shank 240, and which are positioned radially outwardly relative to the axis 250. Still further, it should be understood that the first and second rods 271 and 272 pass through the housing 230, by way of the apertures 235 which have been formed in the spaced end walls 232. As should be understood, the second end 274 of each of the first and second rods 271 and 272 is threaded. Still further, the resilient movement limiting assembly 270 includes a rigid plate which is generally indicated by the numeral 281, and which has an aperture formed therein. Still further, a nut 282 is operable to threadably engage the second end 274 of each of the first and second rods 271 and 272.

As best seen in FIG. 20, a resilient movement limiting member 283 formed of a suitable elastomeric material is provided, and which has a passageway 284 formed therein. The passageway 284 is substantially coaxially aligned relative to the aperture 235 formed in each of the end walls 232. The passageway 284 is operable to receive the respective rods 271 and 272 therethrough. As seen, the resilient movement limiting member 283 is captured and placed into compression therebetween the respective end walls 232, and the rigid plate 281 and is thereafter maintained in compression by means of the nut 282 which threadably engages the second end 274 of the respective first and second rods. A suitable elastomeric substrate useful for fabricating this resilient movement limiting member 283 may be commercially secured from Miner Elastomer Productions of St. Charles, Ill. The fabricated, resilient movement limiting members 283 can be placed into compression to a degree such that they exert force on the first end 244 to permit the shank 240 to be rotated to less than about 40 degrees relative to the axis 250. These same movement limiting members 283 further permit movement of the shank 240 along the arcuately shaped path of travel only upon experiencing a force of greater than about 500 pounds applied to the distal end 245 thereof. As illustrated in FIG. 20, a pair of resilient movement limiting members 283 are shown. These particular movement limiting members may exert substantially the same amount of force to the first end 244 of the shank 240, or further, depending upon performance needs of the agricultural implement 200, may exert unequal amounts of force to the first end 244 of the shank 240. One skilled in the art will readily recognize that a coil spring (not shown) or other biasing arrangements such as fluid actuated cylinders may be readily substituted in place of the respective resilient movement limiting members 283 to achieve the benefits of the present invention as will be described hereinafter. As will be recognized, the respective movement limiting members 283 are operable in combination to restrain the movement of the shank 240 along the first arcuately shaped path of travel 241.

Still further, it is conceivable that the shank assembly 220 could be rendered operable to work with just a single resilient movement limiting assembly 270 under certain environmental conditions. Each of the respective shank assemblies 220 includes a rotatable residue control wheel mounting bracket (hereinafter referred to as the mounting bracket) 290, and which is pivotally or rotatably mounted to the shank 240 (FIG. 18). The mounting bracket includes two portions 290 A and B which are disposed in spaced relation one to the other. The mounting bracket 290 has as first end 291, and an opposite second or distal end 292. Still further, the mounting bracket 290 has a top peripheral edge 293, and an opposite, bottom, peripheral edge 294. A pair of slots 295 are formed in the mounting bracket, and are disposed in spaced relation relative to the top and bottom peripheral edges 293 and 294. The first end 291 of the mounting bracket 290 is rotatably affixed to the shank 240 by means of a fastener 296 which is received through the first aperture 252 as seen in FIG. 19. As seen most clearly by reference to FIG. 18, an adjustment assembly in the form of an adjustable spindle plate 300 is provided. The adjustable spindle plate 300 is adjustably secured to the mounting bracket 290 by a pair of fasteners 301 which are received through the respective pair of slots 295 that are formed in the mounting bracket 290. This arrangement permits the spindle plate to be adjustably positioned along the mounting bracket 290 in order to position individual residue control wheels 302 in an appropriate trailing relation relative to the intended direction of movement 202 of the second form of the invention 200. As will be appreciated from a study of FIGS. 17 and 18, the shank assemblies 220 include a pair of residue control wheels 302 which are rotatably mounted on each of the adjustable spindle plates 300, and which straddle, or are otherwise positioned on the opposite sides of the shank 240. The residue control wheels 302 operate in the manner similar to that described for the first form of the invention whereby the wheels 302 forcibly engage the soil 203, and any agricultural residue deposited thereon, to efficiently stabilize or otherwise urge or force the soil and residue downwardly and underneath the wheels 302 and away from the shank 240. As earlier discussed, this prevents the soil and any agricultural residue from building up in front of the shank 240. The residue control wheels 302 are each mounted for rotation on the adjustable spindle plate 300 by means of a rim 303. A tire 304 of conventional design is received thereabout the rim. Each of the respective tires has a diametral dimension 305 (FIG. 17). The respective residue control wheels 302 are mounted in a position such that they are located in trailing relation, and at a distance from the shank 240, which is less than about their respective wheel diameter 305. Still further, and as was the case with the first form of the invention 10, the respective residue control wheels 302 may be longitudinally offset one relative to the other, or may be further substantially coaxially aligned as seen in FIG. 17.

As best seen by reference to FIG. 18, the respective shank assemblies 220 include a biasing assembly which is generally indicated by the numeral 310, and which exerts a biasing force on the mounting bracket 290. As earlier discussed, the mounting bracket is rotatably moveable relative to the shank 240. In this regard, the biasing assembly 310 has a rod portion 311, which includes a first end 312, and an opposite, second end 313 which has a plurality of screw threads formed therein. A yoke 314 is fastened to the first end 312. The yoke is rotatably affixed, by way of a fastener or other shaft 315, which passes through the second aperture 253 which is formed in the shank 240 (FIG. 19). As seen in FIG. 18, the rod portion 311 is disposed in substantially parallel spaced relation relative to the top peripheral edge 293 of the mounting bracket 290. As will be recognized from a study of FIG. 18, a guide or space plate 316 is affixed therebetween the portions 290 A and B of the mounting bracket 290. The guide or space plate 316 has a distal end portion which extends outwardly relative to the second or distal end 292 thereof, and further defines a passageway 317 which is operable to receive the second end 313 of the rod portion 311. As illustrated in FIG. 18, a biasing spring 320 is received therebetween the yoke 314, and the guide or space plate 316. The guide or space plate 316 is fastened to the mounting bracket 290 by a plurality of fasteners 318 which pass through each of the portions 290 A and B. The biasing spring 320 is secured therebetween the yoke 314, and the distal end of the guide or space plate 316 by way of a nut 321 which threadably cooperates with the second end 313, and which limits the degree of rotation of the mounting plate 290 relative to the shank 240. The biasing assembly 310 defines a second arcuately shaped path of travel 322 for the mounting bracket 290. This second arcuately shaped path of travel 322 is defined between a first position 323 and a second position 324. The biasing assembly is operable to bias the mounting bracket 290 into or in the direction of the first position thereby providing a substantially constant ground pressure for each of the residue control wheels 302. The biasing assembly, of course, permits the respective pair of residue control wheels to move along the path of travel 322 and over obstacles encountered during cultivation, or to further accommodate changes in topography as the implement 200 is used in a field.

Operation

The operation of the described embodiments of the present invention are believed to be readily apparent and are briefly summarized at this point.

As earlier discussed, a first aspect of the present invention relates to an agricultural implement 10, 200 for forming a furrow 12, 204 in a soil 14, 203 and which includes a rotatable shank 70, 240. A resilient, movement limiting member 283 is provided, and which is disposed in force transmitting relation relative to the rotatable shank. Still further, a pair of wheels 130, 302 for earth engaging movement are provided, and which are respectively positioned on the opposite sides of the rotatable shank, and wherein the pair of wheels are positioned substantially laterally outwardly and rearwardly of an intended direction of movement 202 of the shank.

Another aspect of the present invention relates to an agricultural implement 10, 200 for forming a furrow in a soil 14, 203 and which includes a frame 20, 210 which is operable for movement in an intended direction of travel 202 relative to the soil. A toolbar 42, 215 is mounted in substantially transverse relation relative to the intended direction of travel of the frame. A housing 66, 230 is provided and which is mounted on the toolbar and which further includes a pair of spaced sidewalls 231 which define cavity 233. A shank 70, 240 is received, at least in part, in the cavity 233 and is rotatably mounted to the respective sidewalls of the housing and which further has a distal earth working end 78, 245 which forms a furrow 12, 204 in the soil. The agricultural implement 10, 200 further includes a mounting bracket 104, 290 which is disposed in trailing relation relative to the intended direction of movement of the frame and the shank. Still further the agricultural implement 10, 200 includes a pair of earth engaging wheels 130, 302 mounted on the mounting bracket and individually located in laterally outwardly spaced relation relative to the opposite sides of the shank, and in trailing relation relative to the intended direction of travel of the frame and the shank. Finally, the present invention includes a resilient movement limiting assembly 100, 270 borne by the housing, and which is disposed in force transmitting relation relative to the shank, and wherein the resilient movement limiting assembly defines an arcuately shaped path of travel 241 for the shank when force of a predetermined amount is applied to the shank 70, 240.

Yet further, the present invention relates to an agricultural implement 200 for forming a furrow 204 in a soil surface 203, and which includes a housing 230 defining a cavity 233 and which has an end wall 232. A rotatable shank 240 is provided and which has opposite sides, and which further has a first end 244; and an opposite, second, soil engaging end 245. The rotatable shank 240 is received, at least in part, in the cavity 233, and is rotatably affixed to the housing 230.

The rotatable shank has an axis of rotation 250 near the first end 244 thereof, and which is moveable along a first accurately shaped path of travel 241. A resilient, movement limiting member 283 is supported, at least in part, by the end wall 232 of the housing, and which is operable to exert force on the rotatable shank 240 to restrain the movement of the shank along the first arcuately shaped path of travel and bias the shank toward the first position 242. A rod 271 having a first end 273 is disposed in force transmitting relation relative to the first end 244 of the shank 240. Still further, the rod has an opposite, second end 274 which passes through the housing 230, and which is further disposed in force receiving relation relative to the resilient movement limiting member 283. A mounting bracket 290 is rotatably affixed to the shank 240 at a location which is intermediate the first and second ends 244 and 245, respectively. The mounting bracket extends rearwardly relative to an intended direction of movement of the shank 202, and wherein the mounting bracket is further moveable along a second, arcuately shaped path of travel 322. The agricultural implement 200 includes a biasing assembly 310 which is borne by the shank 240 and which exerts force on the mounting bracket 290 to urge it in a given direction relative to the second arcuately shaped path of travel 322. As earlier discussed, the biasing assembly facilitates a substantially constant wheel pressure to the earthen soil 203 and further allows the respective residue control wheels 302 to travel over obstructions that might be present in the region being cultivated. The pair of soil engaging wheels 302 each have a diametral dimension 305, and which are individually rotatably mounted on the mounting bracket 290. The respective wheels 302 are individually located on the opposite sides of the shank 240. As earlier described, at least one of the wheels 302 has an axis of rotation which is positioned at a distance from the shank which is less than about the diametral dimension thereof. Still further, the present invention 200 includes an adjustment assembly in the form of an adjustable spindle plate 300 which is borne by the mounting bracket 290 and which facilitates the mounting of the respective wheels 302 at various distances from the shank 240. As earlier discussed, the resilient movement limiting members 283 may comprise a synthetic elastomeric member, or further may comprise a metal coil spring or other equivalents.

Therefore, it will be seen that the first and second forms of the invention 10, 200 provide a convenient means whereby minimum tillage agricultural practices may be conducted in a manner not possible heretofore. The present forms of the invention are operable to avoid many of the shortcomings attendant with the prior art practices including the build-up of residue and other trash forward of the respective shanks thereby impairing the rapid cultivating of a given area.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An agricultural implement for forming a furrow in a soil, comprising:
   a rotatable shank;
   a resilient, movement limiting member disposed in force transmitting relation relative to the rotatable shank;
   a pair of wheels mounted for earth engaging movement, and respectively positioned on the opposite sides of the rotatable shank, and wherein the pair of wheels are positioned substantially laterally outwardly and rearwardly of an intended direction of movement of the shank;
   a mounting bracket borne by the shank; and
   an adjustment assembly borne by the mounting bracket, and wherein the respective wheels are mounted for rotation on the adjustment assembly, and wherein the adjustment assembly permits the respective wheels to be adjustably mounted at various distances in trailing relation relative to the shank.

2. An agricultural implement as claimed in claim 1, and wherein the movement limiting member comprises a coil spring.

3. An agricultural implement as claimed in claim 1, and wherein the movement limiting member comprises a forceably opposed pair of synthetic elastomeric members.

4. An agricultural implement for forming a furrow in a soil, comprising:
   a rotatable shank;
   a forceably opposed pair of synthetic elastomeric members disposed in force transmitting relation relative to the rotatable shank;
   a pair of rods each having a first end coupled in force transmitting relation relative the shank, and an opposite second end which is disposed in force receiving relation relative to the respective synthetic elastomeric; and
   a pair of wheels mounted for earth engaging movement, and respectively positioned on the opposite sides of the rotatable shank, and wherein the pair of wheels are positioned substantially laterally outwardly and rearwardly of an intended direction of movement of the shank.

5. An agricultural implement as claimed in claim 4, and wherein the shank has an axis of rotation, and wherein the first end of each rod transmits force to the shank at a location which is radially outwardly disposed relative to the axis of rotation of the shank.

6. An agricultural implement for forming a furrow in soil, comprising:
   a rotatable shank;
   a forceably opposed pair of synthetic elastomeric members which are disposed in force transmitting relation relative to the shank, and wherein the force transmitted by the respective elastomeric members to the shank causes the shank to have a limited arcuately shaped path of travel;
   a pair of rods each having a first end coupled in force transmitting relation relative to the shank, and an opposite second end which is disposed in force receiving relation relative to the respective elastomeric members; and
   a pair of wheels mounted for earth engaging on the opposite sides of the shank, and substantially laterally outwardly and rearwardly of an intended direction of movement of the shank.

7. An agricultural implement as claimed in claim 6, and wherein the shank has a distal soil engaging end, and further is moveable along the arcuately shaped path of travel between a first position to a second position, when the resilient member is compressed, and wherein the application of a force of greater than about 500 pounds applied to the distal end of the shank causes the resilient member to compress and permits movement of the shank between the first and second positions.

8. An agricultural implement for forming a furrow in a soil, comprising:

a frame which is operable for movement in an intended direction of travel relative to a soil;

a toolbar borne by the frame, and mounted in substantially transverse relation relative to the intended direction of travel of the frame;

a housing mounted on the toolbar and having a pair of space sidewalls which define cavity;

a shank received, at least in part, in the cavity and rotatably mounted to the respective sidewalls of the housing and which further has a distal earth working end which forms a furrow in the soil;

a mounting bracket borne by the shank and disposed in trailing relation relative to the intended direction of movement of the frame and the shank;

a pair of earth engaging wheels mounted on the mounting bracket and individually located in laterally outwardly spaced relation relative to the opposite sides of the shank, and in trailing relation relative to the intended direction of travel of the frame and the shank; and a resilient movement limiting assembly borne by the housing, and which is disposed in force transmitting relation relative to the shank, and wherein the resilient movement limiting assembly defines an arcuately shaped path of travel for the shank when force of a predetermined amount is applied to the shank.

9. An agricultural implement as claimed in claim 8, and wherein the frame has at least two earth engaging wheels which support the frame in spaced rolling engagement relative to the soil, and wherein the toolbar is moveably mounted on the frame so as to permit the shank and the earth engaging wheels which are mounted on the mounting bracket to be moved out of contact with the soil.

10. An agricultural implement as claimed in claim 8, and further comprising:

a tank borne by the frame and operable to dispense a liquid to the soil; and a conduit coupled in fluid flowing relation relative to the tank, and having a distal end which is mounted on the shank and in trailing relation relative to the intended direction of travel of the frame and shank, and wherein liquid dispensed by the tank exits the distal end of the conduit and onto the adjacent soil.

11. An agricultural implement as claimed in claim 8, and wherein the housing has opposite end walls which are affixed to the opposite sidewalls, and wherein the movement limiting member is mounted on one of the opposite end walls.

12. An agricultural implement as claimed in claim 8, and wherein the housing has opposite end walls which are individually affixed to the opposite sidewalls, and wherein the agricultural implement includes a second resilient movement limiting member, and wherein the individual resilient movement limiting members are mounted on the respective opposite end walls.

13. An agricultural implement as claimed in claim 12, and wherein a first passageway is formed in each of the opposite end walls, and wherein each resilient movement limiting member defines a second passageway which is substantially coaxially aligned relative to the respective first passageway formed in each of the opposite end walls, and wherein the agricultural implement further comprises a pair of rods each having a first end which is disposed in force transmitting relation relative to the shank, and an opposite second end which is oriented in force receiving relation relative to the respective resilient movement limiting members, and wherein the respective rods are received through each of the first and second substantially coaxially aligned passageways.

14. An agricultural implement as claimed in claim 13, and wherein the shank has an axis of rotation, and wherein the first end of each the respective rods transmit force from the respective resilient movement limiting assemblies to the shank at locations which are radially outwardly disposed relative to the axis of rotation of the shank.

15. An agricultural implement as claimed in claim 14, and wherein the arcuately shaped path of travel is defined between a first and a second position, and wherein the predetermined amount of force applied to the shank to move it from the first to the second position is greater than about 500 pounds.

16. An agricultural implement for forming a furrow in a soil, comprising:

a housing defining a cavity and having an end wall;

a rotatable shank having opposite sides, and further having a first end, and an opposite, second, soil engaging end, and wherein the rotatable shank is received, at least in part, in the cavity, and is rotatably affixed to the housing, and wherein the rotatable shank has an axis of rotation near the first end thereof, and which is moveable along a first accurately shaped path of travel;

a resilient, movement limiting member supported, at least in part, by the end wall of the housing, and which is operable to exert force on the shank to restrain the movement of the shank along the first arcuately shaped path of travel;

a rod having a first end which is disposed in force transmitting relation relative to the first end of the shank, and an opposite, second end which passes through the housing, and which is further disposed in force receiving relation relative to the resilient movement limiting member;

a mounting bracket rotatably affixed to the shank at a location which is intermediate the first and second ends thereof, and which extends rearwardly relative to an intended direction of travel of the shank, and wherein the mounting bracket is moveable along a second, arcuately shaped path of travel;

a biasing assembly borne by the shank and which exerts force on the mounting bracket to urge it in a given direction relative to the second arcuately shaped path of travel; and a pair of soil engaging wheels each having a diametral dimension, and which are individually rotatably mounted on the mounting bracket, and wherein the respective wheels are individually located on the opposite sides of the shank, and wherein at least one of the wheels has an axis of rotation which is positioned at a distance from the shank which is less than about the diametral dimension thereof.

17. An agricultural implement as claimed in claim 16, and further comprising:

an earth traversing frame which is operable for movement in an intended direction of travel relative to the soil; and a toolbar moveably borne by the frame, and wherein the housing is mounted on the toolbar, and wherein the toolbar is moveable relative to the frame so as to permit the shank, and the pair of soil engaging wheels, to be moved out of contact with the soil.

18. An agricultural implement as claimed in claim 17, and further comprising:

a tank borne by the frame and operable to dispense a fluid to the soil; and a conduit coupled in fluid flowing relation relative to the tank, and having a distal end which is mounted on the shank, and which is disposed in trailing relation relative to the intended direction of travel of the frame, and shank, and wherein liquid dispensed by the tank exits the distal end of the conduit, and onto the adjacent soil.

19. An agricultural implement as claimed in claim 16, and further comprising:
an adjustment assembly borne by the mounting bracket, and which facilitates the mounting of the respective wheels at various distances from the shank.

20. An agricultural implement as claimed in claim 16, and wherein the movement limiting member comprises a spring.

21. An agricultural implement as claimed in claim 16, and wherein the movement limiting member is a synthetic elastomeric member.

22. An agricultural implement as claimed in claim 16, and further comprising:
a second, resilient, movement limiting member supported, at least in part, by the housing and which is operable to exert force on the first end of the shank to restrain the movement of the shank along the first arcuately shaped path of travel.

23. An agricultural implement as claimed in claim 22, and further comprising:
a second rod having a first end which is disposed in force transmitting relation relative to the first end of the shank, and an opposite, second end, which passes through the housing, and which is further disposed in force receiving relation relative to the second, resilient, movement limiting member.

24. An agricultural implement as claimed in claim 22, and wherein the pair of resilient movement limiting members restrain the movement of the shank along the first arcuately shaped path of travel to less than about 40 degrees of rotation.

25. An agricultural implement as claimed in claim 22, and wherein the pair of resilient movement limiting members exert substantially the same amount of force to the first end of shank.

26. An agricultural implement as claimed in claim 22, and wherein the pair of resilient movement limiting members exert unequal amounts of force to the first end of the shank.

* * * * *